(12) United States Patent
Dhodapkar et al.

(10) Patent No.: US 12,489,800 B2
(45) Date of Patent: *Dec. 2, 2025

(54) EXCHANGING STATUS MESSAGES DURING A CALL

(71) Applicant: Google LLC, Mountain View, CA (US)

(72) Inventors: Chinmay Dhodapkar, Mountain View, CA (US); Amruth Ramachandran, Fremont, CA (US); Radhika Agrawal, San Diego, CA (US); David J. Krause, Kenosha, WI (US)

(73) Assignee: Google LLC, Mountain View, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/566,531

(22) PCT Filed: Jun. 2, 2021

(86) PCT No.: PCT/US2021/035518
§ 371 (c)(1),
(2) Date: Dec. 1, 2023

(87) PCT Pub. No.: WO2022/256008
PCT Pub. Date: Dec. 8, 2022

(65) Prior Publication Data
US 2024/0267417 A1    Aug. 8, 2024

(51) Int. Cl.
*G06F 13/00* (2006.01)
*H04L 65/1016* (2022.01)
(Continued)

(52) U.S. Cl.
CPC ...... *H04L 65/1069* (2013.01); *H04L 65/1016* (2013.01); *H04L 65/1073* (2013.01); *H04L 65/70* (2022.05); *H04L 65/80* (2013.01)

(58) Field of Classification Search
CPC ............. H04L 65/1069; H04L 65/1016; H04L 65/1073; H04L 65/70; H04L 65/80; H04L 69/24
(Continued)

(56) References Cited

U.S. PATENT DOCUMENTS

| | | | |
|---|---|---|---|
| 6,934,756 B2 * | 8/2005 | Maes | ...................... H04L 65/70 704/E15.047 |
| 9,301,252 B2 | 3/2016 | Narasimha | |

(Continued)

FOREIGN PATENT DOCUMENTS

| | | |
|---|---|---|
| CN | 106899380 B | 3/2020 |
| GB | 2488120 | 8/2012 |

(Continued)

OTHER PUBLICATIONS

DTMF Interface in Exchange Online, https://learn.microsoft.com/en-us/exchange/dtmf-interface-exchange-2013-help, Jan. 25, 2023, 5 pages.

(Continued)

*Primary Examiner* — Kenneth R Coulter
(74) *Attorney, Agent, or Firm* — McDonnell Boehnen Hulbert & Berghoff LLP

(57) ABSTRACT

This document describes techniques and devices for exchanging status messages during a call. Techniques described herein utilize a computing device to establish a real-time person-to-person media session (e.g., a call) with another device through a wireless communication network. Through the wireless communication network, the computing device may perform a handshake procedure to determine whether the other device supports an exchange of status messages during the media session. If supported by both devices, the computing device may exchange status messages using, for instance. Real-Time Transport Protocol (Continued)

(RTP) header extensions and/or unused dual-tone multi-frequency (DTMF) digits (e.g., digits A, B, C, or D).

16 Claims, 10 Drawing Sheets

(51) Int. Cl.
    *H04L 65/1069*     (2022.01)
    *H04L 65/1073*     (2022.01)
    *H04L 65/70*     (2022.01)
    *H04L 65/80*     (2022.01)

(58) Field of Classification Search
    USPC .......................................................... 709/228
    See application file for complete search history.

(56) References Cited

U.S. PATENT DOCUMENTS

| | | | |
|---|---|---|---|
| 11,089,134 | B1 | 8/2021 | Gordon |
| 11,134,538 | B2 * | 9/2021 | Oyman ................. H04W 80/12 |
| 2002/0184373 | A1 | 12/2002 | Maes |
| 2006/0270388 | A1 | 11/2006 | Veeramachaneni et al. |
| 2007/0123286 | A1 | 5/2007 | Mock et al. |
| 2009/0109959 | A1 | 4/2009 | Elliott |
| 2013/0315079 | A1 | 11/2013 | Edge |
| 2014/0375747 | A1 | 12/2014 | Martinez |
| 2015/0145946 | A1 | 5/2015 | Xin et al. |
| 2015/0289168 | A1 | 10/2015 | Jafry et al. |
| 2016/0192166 | A1 | 6/2016 | deCharms |
| 2018/0294959 | A1 | 10/2018 | Traynor et al. |
| 2019/0274186 | A1 | 9/2019 | Oyman et al. |
| 2020/0022002 | A1 | 1/2020 | Karanam |
| 2020/0092417 | A1 | 3/2020 | Eilts et al. |
| 2021/0373676 | A1 | 12/2021 | Jorasch |
| 2024/0267422 | A1 * | 8/2024 | Resman ............. H04L 65/1069 |

FOREIGN PATENT DOCUMENTS

| | | |
|---|---|---|
| JP | 2012074769 | 4/2012 |
| KR | 20060020504 A | 3/2006 |
| WO | 2021/011772 A1 | 1/2021 |

OTHER PUBLICATIONS

Schulzrinne et al., "RTP: A Transport Protocol for Real-Time Applications," rfc3550.text, Network Working Group, Jul. 2003, 104 pages.

* cited by examiner

EXCHANGING STATUS MESSAGES DURING A CALL

This application is a national stage application under 35 U.S.C. § 371 of International Application No. PCT/US2021/035518, filed Jun. 2, 2021, the disclosure of which is explicitly incorporated by reference herein in its entirety.

BACKGROUND

A computing device (e.g., smartphone) may communicate through a communication network with another computing device. For example, a first computing device may connect to a second computing device through a communication network for purposes of a real-time person-to-person media session (e.g., a call). In some cases, the first computing device may attempt to exchange information with the second computing device during a call to communicate status information of the first computing device (e.g., a device status, connectivity quality, custom messages). Such an exchange of information through a communication network, however, often includes a proxy (e.g., a mobile Internet Protocol (IP) proxy, a firewall) that may modify or ignore information that is not understood. For example, a message of "battery low" could be blocked by the proxy, preventing devices from receiving the information and users from understanding, for instance, a cause of a call-quality issue (e.g., a dropped call) in real-time. As a result, there are barriers preventing computing devices from exchanging information during a call.

SUMMARY

This document describes techniques and devices for exchanging status messages during a real-time person-to-person media session, such as a call or video call. Techniques described herein utilize a computing device to establish a real-time person-to-person media session, for instance, using an Internet Protocol Multimedia Core Network Subsystem (IMS) architectural framework, with another device through a wireless communication network (e.g., using one or more base stations, a peer-to-peer network). For ease of description, the real-time person-to-person media session will be generally referred to as a call in this disclosure. During the call, the computing device may exchange status messages with another device, for instance, without requiring modifications to existing standards (e.g., mechanical, software, network) or requiring changes to a carrier infrastructure (e.g., over Long-Term Evolution (LTE), 5G New Radio (NR), or wireless local area network). To enable the exchange of status messages, the computing device performs a handshake procedure to establish a device-to-device communication with the other computing device. The handshake procedure may also be used to determine whether the other device supports exchanging status messages using, for instance, Real-Time Transport Protocol (RTP) header extensions or unused dual-tone multi-frequency (DTMF) digits (e.g., digits A, B, C, or D).

Aspects described below include techniques for exchanging status messages during a call. An example method is performed by a first computing device and includes receiving registration in a wireless communication network and then establishing a real-time person-to-person media session over the wireless communication network with a second computing device. A handshake procedure is performed by the first computing device to determine whether the second computing device supports an exchange of status messages between the first computing device and the second computing device. The first computing device also generates a status message that includes status information of the first computing device. If the second computing device supports the exchange of status messages, then the first computing device sends the first message to the second computing device.

This Summary is provided to introduce simplified concepts for exchanging status messages during a call, which is further described below in the Detailed Description and Drawings. This Summary is not intended to identify essential features of the claimed subject matter, nor is it intended for use in determining the scope of the claimed subject matter.

BRIEF DESCRIPTION OF DRAWINGS

Techniques and apparatuses for exchanging status messages during a call are described with reference to the following diagrams.

The use of same numbers in different instances through the drawings may reference like features and components.

DETAILED DESCRIPTION

Overview

Figure 1:
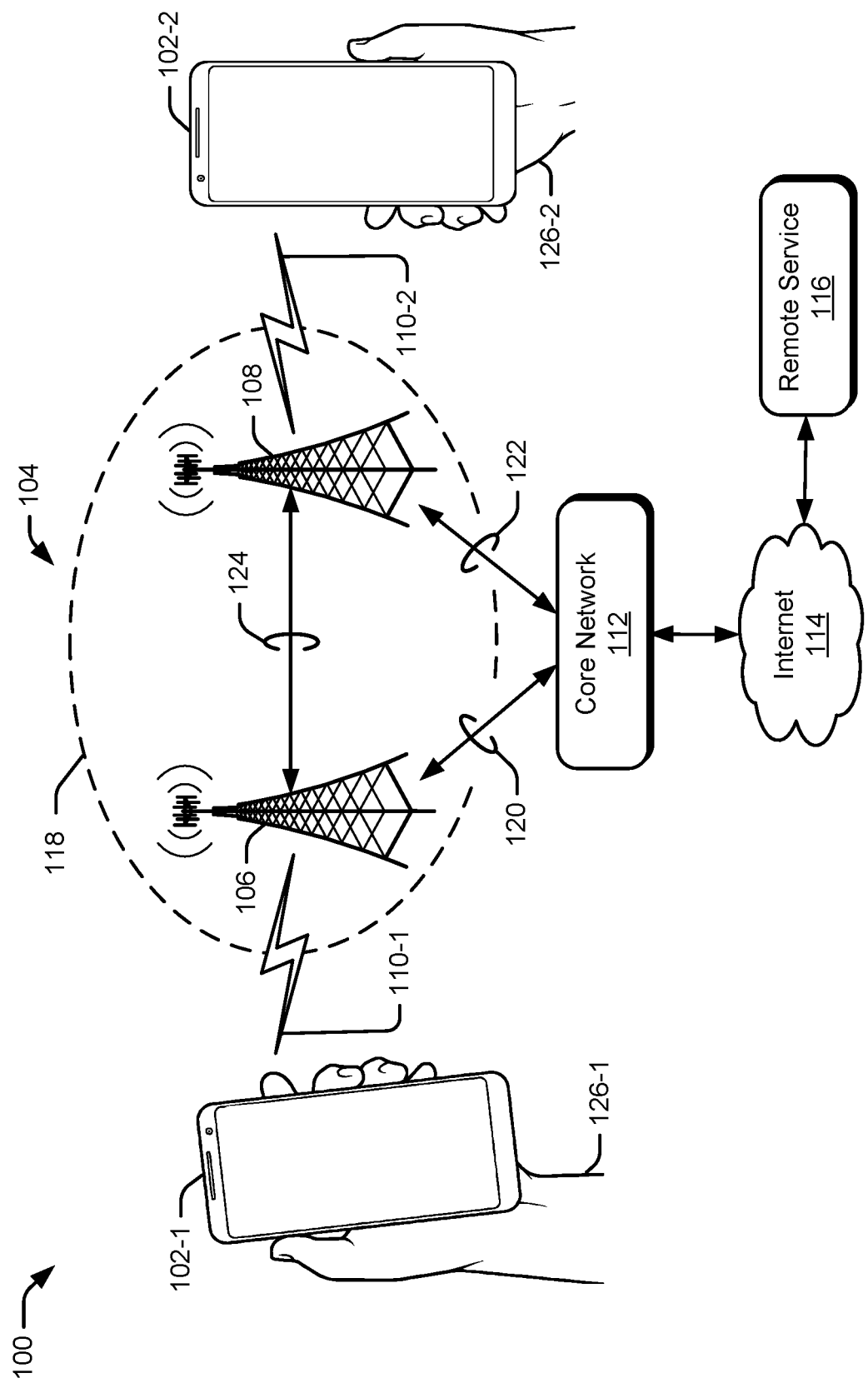
FIG. 1 illustrates an example environment in which status messages may be exchanged by connected computing devices during a call, in accordance with techniques and computing devices of this disclosure.

A computing device may attempt to exchange status messages with another computing device during a real-time person-to-person media session (e.g., a call or video call, herein referred to for brevity as a "call") by which to communicate status information of the device. This status information may help the other computing device, for instance, mitigate call-quality issues and improve the user experience. In an example, a first device may transmit a status message to a second device during a call to exchange call-quality information. The status message may include one or more of device health information (e.g., battery charge), a quality of a network, user inputs, a connectivity quality of the call, a custom message, or other information used to identify and mitigate call-quality issues on a local device. Such an exchange of status messages by devices through a communication network, however, often includes a proxy that may modify or ignore status messages that are not understood (e.g., due to unrecognized characters, formats, or features). A proxy (e.g., an IP proxy, a firewall) may be used as an intermediate between, for instance, computing devices and servers to improve privacy, security, and/or load balancing of requests. In the current example, a proxy may block a status message of "battery low" sent by the first device to the second device, preventing the second device from receiving the information. If the call drops, a user of the second device may be left wondering why the call ended and if their device was the problem, when in fact, a status message would have indicated that the call dropped due to a low battery of the first device. As a result, there are barriers preventing computing devices from exchanging status messages during a call.

To address these challenges, this document describes techniques for exchanging status messages during a call and apparatuses configured to utilize these techniques. In aspects, an exchange of status messages is performed in real time by a first computing device and a second computing device, which are referred to throughout this document as simply a first device and a second device, respectively, for short. Techniques described herein may utilize a first device to establish a real-time person-to-person media session (e.g., a call) with a second device through a wireless communication network. The first device may perform operations of a handshake procedure to establish whether the second device supports an exchange of status messages (e.g., a device-to-device communication), for instance, during a call. The handshake procedure may include transmitting a request message (e.g., a probe) from the first device to the second device and then waiting for a response message from the second device. The first device may retransmit the request message over a duration of time (e.g., repeatedly) since delivery of requests may not be guaranteed over the wireless communication network. If a response message is received by the first device within the duration of time, then the first device may determine that the second device supports the exchange of status messages. Additionally, the second device may perform operations associated with the handshake procedure, which includes determining the first device supports a device-to-device communication upon receiving the request message. The second device may also transmit a message response to the first device. After establishing a device-to-device communication, one or both devices may begin exchanging status messages.

Through the wireless communication network, the computing device may exchange status messages with the other device without requiring modifications of existing standards (e.g., mechanical, software, network) or requiring any changes to a carrier infrastructure (e.g., over Long-Term Evolution (LTE), 5G New Radio (5G NR), or wireless local area network). Additionally, a device may use the handshake procedure to determine whether another device on the call supports exchanging status messages, for instance, using RTP header extensions and/or unused DTMF digits (e.g., digits A, B, C, or D), both of which are often supported by existing standards of computing devices. The handshake procedure may also include contingency (e.g., fallback) operations in case a device does not support one or more of RTP header extensions or unused DTMF digits.

Example Environment

FIG. 1 illustrates an example environment 100 in which status messages may be exchanged by connected computing devices during a call, in accordance with techniques and computing devices of this disclosure. Example environment 100 includes a first computing device 102-1 (device 102-1) that communicates with a first base station 106 through one or more wireless communication links 110 (wireless link 110), illustrated as wireless link 110-1. The example environment 100 further includes a second computing device 102-2 (device 102-2) that communicates with a second base station 108 through one or more wireless links 110, illustrated as wireless link 110-2. For ease of description, the first device 102-1 and the second device 102-2 may each be referred to as a computing device 102, and the first base station 106 and the second base station 108 are collectively referred to as a base station 104.

A macrocell, microcell, small cell, picocell, distributed base station, and the like, or any combination or future evolution thereof, may implement the base station 104 (e.g., an Evolved Universal Terrestrial Radio Access Network Node B. E-UTRAN Node B, evolved Node B, eNodeB, eNB, Next Generation eNB, ng-eNB. Next Generation Node B, gNode B, gNB, a base station transceiver system, a Wireless Local Access Network (WLAN) router, a satellite, a terrestrial television broadcast tower, an access point, a peer-to-peer device, another computing device acting as a base station, or the like). The base station 104 communicates with the computing devices 102 using the wireless links 110, which may be implemented as any suitable type of wireless link. The wireless links 110 may include control and data communication, such as downlink of data and control information communicated from the base stations 104 to the computing devices 102, uplink of other data and control information communicated from the computing devices 102 to the base station 104, or both. The wireless links 110 may include one or more wireless links (e.g., radio links) or bearers implemented using any suitable communication protocol or standard, or combination of communication protocols or standards, such as 3rd Generation Partnership Project Long-Term Evolution (3GPP LTE). 5G NR, and so forth.

The base stations 104 (first base station 106, second base station 108) are collectively a Radio Access Network 118 (e.g., RAN, Evolved Universal Terrestrial Radio Access Network. E-UTRAN, 5G NR RAN or NR RAN). The base stations 106 and 108 in the RAN 118 are connected to a core network 112 (e.g., an IMS architectural framework that can interface with other networks for voice, images, videos, texts, messaging, and the like). The base stations 106 and 108 may connect, at 120 and 122 respectively, to the core network 112 through an NG2 interface for control-plane signaling using any one of an NG3 interface for user-plane data communications when connecting to a 5G core network, an SI interface for control-plane signaling and user-plane data communications when connecting to an Evolved Packet Core (EPC) network, and the like. The base stations 106 and 108, at 124, may communicate using an Xn Application Protocol (XnAP) through an Xn interface, using an X2 Application Protocol (X2AP) through an X2 interface to exchange user-plane and control-plane data, and the like. A computing device 102 may connect, using the core network 112, to public networks, including the Internet 114, to interact with a remote service 116.

The disclosed techniques of exchanging status messages during a call may be performed by one or more of the first device 102-1 or the second device 102-2. In the example environment 100, the first device 102-1 utilizes a wireless link 110-1 to perform signaling and establish a call (e.g., using the IMS architectural framework) with the second device 102-2 through a communication network (e.g., using the base station 104). For example, the first computing device 102-1 may send a Session Initiation Protocol (SIP) invite to a network proxy to request registration in an IMS network.

The real-time person-to-person media session (the call) may include, for instance, an audio call, a video call, a connection on a shared server, a voice-over-long-term evolution (VOLTE) call, a voice-over-internet-protocol (VOIP) call, a voice-over-5G New Radio (VoNR) call, a voice-over-Wi-Fi (VoWiFi) call, and so forth. Establishment of the call enables a first user 126-1 to communicate with a second user 126-2, utilizing their respective computing devices 102. For ease of description, the first user 126-1 and the second user 126-2 may each be referred to as a user 126.

In the example environment 100, the first device 102-1 and the second device 102-2 may perform operations of a handshake procedure to determine if the other device supports a device-to-device communication during a call. If it is determined that both devices support the device-to-device communication, then the first device 102-1 and the second device 102-2 may exchange status messages during the call. Furthermore, the handshake procedure may be used to determine whether the other device supports exchanging status messages using RTP header extensions and/or unused DTMF digits, both of which are often supported by existing standards of computing devices 102. While the example computing devices illustrated and described in this publication are smartphones, other types of computing devices 102 may also support the techniques described herein, as further described with respect to FIG. 2.

Example Computing Device

Figure 2:
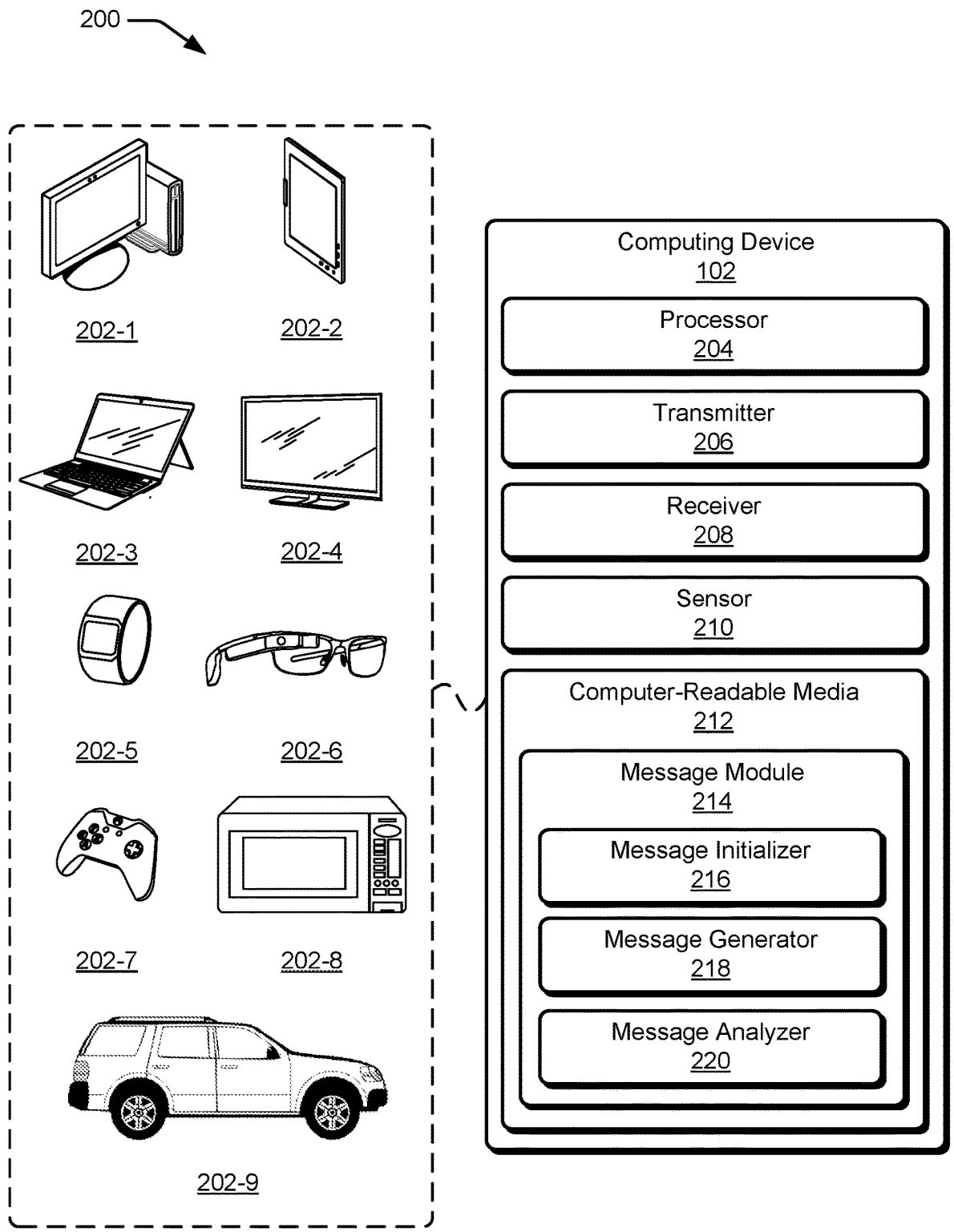
FIG. 2 illustrates an example computing device, in accordance with the techniques of exchanging status messages during a call of this disclosure.

FIG. 2 illustrates an example computing device 102, in accordance with the techniques of exchanging status messages during a call of this disclosure. The computing device 102 is illustrated with various non-limiting example devices, including a desktop computer 202-1, a tablet 202-2, a laptop 202-3, a television 202-4, a computing watch 202-5, computing glasses 202-6, a gaming system 202-7, a microwave 202-8, and a vehicle 202-9. Other devices may also be used, including a home-service device, a smart speaker, a smart thermostat, a security camera, a baby monitor, a Wi-Fi® router, a drone, a trackpad, a drawing pad, a netbook, an e-reader, a home-automation and control system, a wall display, a virtual-reality headset, and/or another home appliance. The computing device 102 may be wearable, non-wearable but mobile, or relatively immobile (e.g., desktops, appliances).

The computing device 102 may include a processor 204 including, for example, one or more of a central processing unit (CPU), a data processing unit (DPU), a graphics processing unit (GPU), and so forth. The computing device 102 may also include at least one transmitter 206 and at least one receiver 208 used to transmit signals (e.g., messages) to and receive signals from another device, respectively. Though not illustrated in FIG. 2, the computing device 102 may alternatively include a transceiver that combines the functionality of the transmitter 206 and receiver 208 into one feature.

The computing device 102 may include at least one sensor 210, used, in part, to determine status information (e.g., contextual information of the computing device 102) that may be included in one or more status messages exchanged during a call. A sensor 210 may include, for instance, a camera, a microphone, a speaker, an ambient light sensor, a biometric sensor, an accelerometer, a gyroscope, a magnetometer, a proximity sensor, a global navigation satellite system (GNSS) sensor, a touchscreen sensor, a health sensor, a barcode scanner, a quick response (QR) code scanner, a barometer, a radar sensor, and so forth.

The computing device 102 illustrated in FIG. 2 also includes a computer-readable medium (CRM) 212. Applications and/or an operating system (not illustrated) embodied as computer-readable instructions on the CRM 212 are executed by the processor 204 and provide some of the functionalities described herein. The CRM 212 may include instructions for directing a message module 214 of the computing device 102 to perform the techniques of exchanging status messages. In particular, the message module 214 may perform operations of a handshake procedure to establish a device-to-device communication before exchanging status messages between devices during a call.

The device-to-device communication may be established using a message initializer 216 of the message module 214. The message initializer 216 may establish the device-to-device communication by instructing a message generator 218 to generate a request message that may be transmitted to another device on the call using the transmitter 206. If the computing device 102 receives a response message using the receiver 208, a message analyzer 220 of the message module 214 analyzes (e.g., decodes, translates) this message as input to the message initializer 216. Once the computing device 102 establishes the device-to-device communication with another device, the message generator 218 and message analyzer 220 may additionally be used to generate and analyze, respectively, status messages exchanged between the devices.

Device-to-Device Communication

To exchange status messages during a call, a device-to-device communication may be established by computing devices 102 (e.g., the first device 102-1 and the second device 102-2) using a handshake procedure. The exchange of status messages may be performed without a user 126 being directly involved (e.g., a passive exchange as perceived by the user 126). For example, the first device 102-1 may receive and/or transmit one or more status messages during a call with the second device 102-2, without either the first user 126-1 or the second user 126-2 performing the exchange directly. While the example computing devices 102 of the first device 102-1 and the second device 102-2 support this exchange of status messages in the example environment 100, some computing devices 102 may not support such an exchange. Therefore, a first device 102-1 may need to determine if a connected second device 102-2 supports a device-to-device communication before status messages are exchanged, as further described with respect to FIG. 3.

Figure 3:
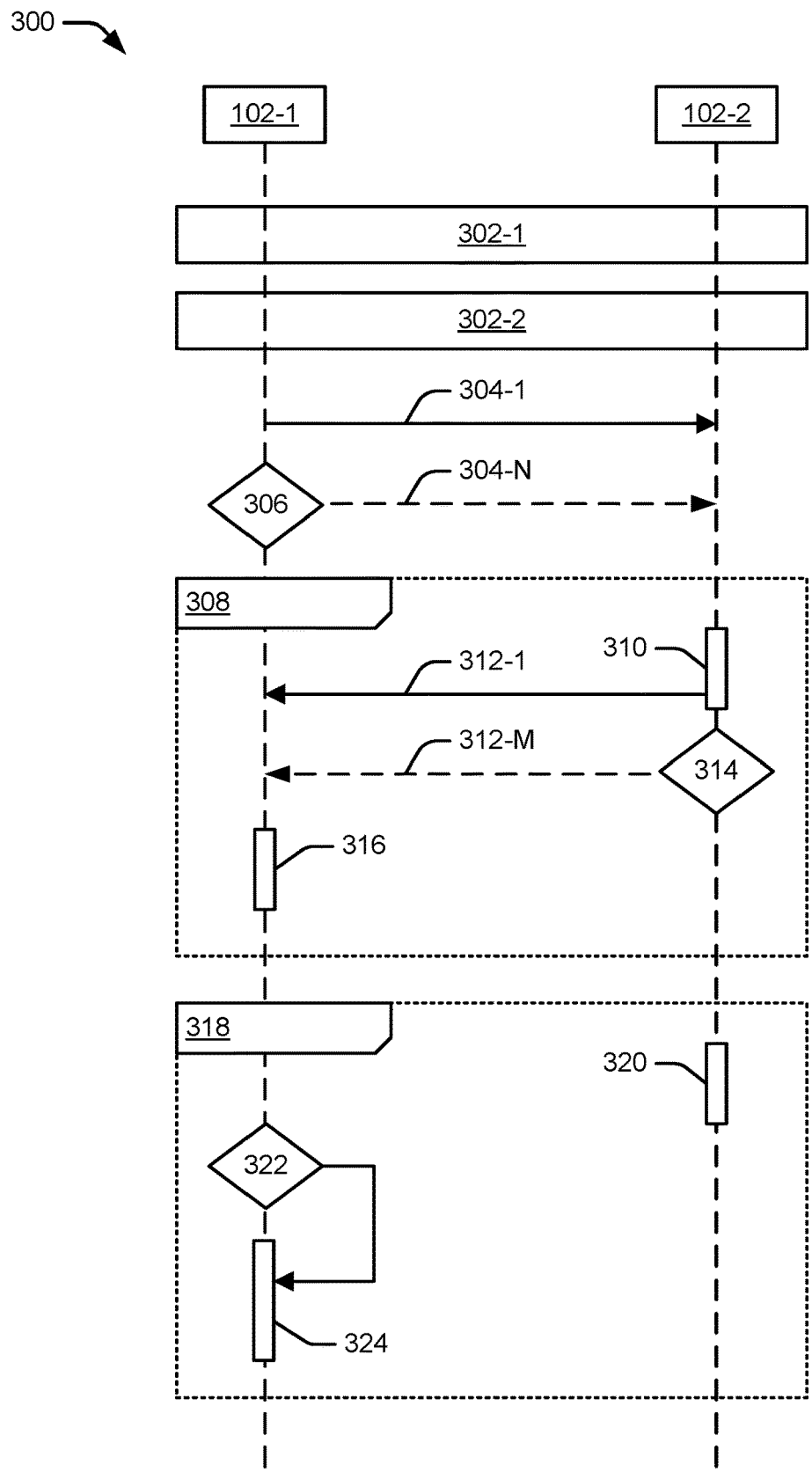
FIG. 3 illustrates an example handshake procedure that may be used to establish a device-to-device communication (e.g., an exchange of status messages) during a call.

FIG. 3 illustrates an example handshake procedure 300 that may be used to establish a device-to-device communication (e.g., an exchange of status messages) during a call. The example handshake procedure 300 is illustrated as a set of operations (or acts) performed by a system that includes the first device 102-1 and the second device 102-2. One or more of these computing devices 102 may utilize a respective message module 214 of that computing device 102 to enable the operations shown. The example handshake procedure 300 is not limited to the operations shown and can be rearranged, repeated, or eliminated as needed to enable techniques described herein. Two lifelines are depicted in 300 in which operations performed by the first device 102-1 are at least partially oriented about or emanate from the first lifeline and operations performed by the second device 102-2 are at least partially oriented about or emanate from the second lifeline.

While the example handshake procedure 300 may be performed by the message initializer 216 of the message module 214, in general, the example handshake procedure 300 may be performed by the processor 204, another module of the CRM 212, or any combination thereof. Operations of the example handshake procedure 300 may be performed prior to a call (pre-call), while placing a call (e.g., after a call has been initiated by a first device but before a second device is connected to the call), and/or during a call. After establishing the device-to-device communication, status messages may be exchanged while placing a call or during a call. In general, the device-to-device communication may be manually enabled or disabled on any device by a user based on, for instance, user needs. It is assumed in 300 that the first device 102-1 has enabled a device-to-device communication feature and is performing a handshake procedure to determine, in part, whether the second device 102-2 has also enabled this feature if supported by the device.

At a network-connection procedure 302-1, the first device 102-1 and the second device 102-2 establish a connection (e.g., using a wireless link 110) to a wireless communication network using one or more base stations (e.g., a base station 104), a common server, a peer-to-peer network, and/or a client-server model that enables the techniques described herein. The base stations 104 may enable connection to the core network 112 (e.g., an IMS network connection). For example, the first device 102-1 may request registration in an IMS network.

At a call-connection procedure 302-2, a real-time person-to-person media session (a call) is established between the first device 102-1 and the second device 102-2 upon establishing a connection to the wireless communication network. For example, the first device 102-1 may receive registration in the IMS network and then begin setting up an audio call with the second device 102-2. The call may include one or more of an audio call, a video call, a connection on a shared server, a VOLTE call, a VoIP call, a VoNR call, a VoWiFi call, and so forth.

The first device 102-1 may transmit a request message 304 (illustrated in 300 as a first request message 304-1). This request message 304 may include one or more binary digits (bits), a version of a messaging protocol (e.g., device-to-device communication) supported by the first device 102-1, a tone, a message, a set of instructions, and so forth, which may be transmitted to the connected second device 102-2. A message initializer 216 of the first device 102-1 may establish the device-to-device communication by instructing the first device 102-1 to transmit a request message 304 to the second device 102-2 using a transmitter 206 to determine whether the second device 102-2 supports an exchange of status messages during a call.

The request message 304 may be generated by the message generator 218 and retransmitted over a duration of time (e.g., periodically every 40 milliseconds (ms)), because receipt of the request may not be guaranteed over a wireless communication network. During the duration of time, a first receipt-verification procedure 306 (later followed by a response process 308 and a first acknowledgment procedure 310) may be performed by the first device 102-1 to determine whether a response message 312 has been received from the second device 102-2. If a response message 312 has not been received at a given time within the duration of time, then the first device 102-1 may retransmit the request message 304 (illustrated in 300 as another request message 304-N, where N represents an integer value greater than unity that monotonically increases with every retransmission). The first device 102-1 may retransmit the request until either a response message 312 has been received by the first device 102-1 or the duration of time has expired. Retransmissions of the request message 304 may be performed continuously, periodically, at predetermined times, or intermittently over the duration of time based on user needs (e.g., conservation of battery charge).

The duration of time may be measured relative to a time at which the first request message 304-1 was transmitted from the first device 102-1. In particular, a timer may be triggered to an active state (e.g., triggering a start of the timer) upon transmitting the first request message 304-1. The timer (e.g., clocking system) may be used to count time within the duration of time and remain in the active state until the duration of time expires or a response message 312 is received from the second device 102-2. At the first receipt-verification procedure 306, the first device 102-1 may additionally determine whether the timer is in the active state or an inactive state (e.g., indicating the duration of time has expired). At a given time within the duration of time, if the timer is determined to be in the active state and a response message 312 has not been received, then the first device 102-1 may retransmit the request message 304.

In the example handshake procedure 300, the response process 308 may be performed, if the second device 102-2 supports the device-to-device communication. At the first acknowledgment procedure 310, the second device 102-2 may determine that the first device 102-1 supports the device-to-device communication, for instance, based on receiving the request message 304. If the second device 102-2 receives retransmitted request messages (e.g., 304-N) from the first device 102-1, then the second device 102-2 may ignore any additional requests that are similar to a first received request message 304. The second device 102-2 may store device-to-device communication settings of the first device 102-1 on the second device 102-2 (e.g., a CRM 212) for future reference.

The second device 102-2 may also transmit a response message 312 (illustrated in 300 as a first response message 312-1) to the first device 102-1 that includes one or more bits, a version of the messaging protocol supported by the second device 102-2, a tone, a message, a set of instructions, and so forth, which is similar to or distinct from the request message 304. Specifically, a receiver 208 of the second device 102-2 may receive the request message 304 from the first device 102-1 and the message initializer 216 of the second device 102-2 may determine that the first device 102-1 supports the device-to-device communication. This message initializer 216 also may instruct a message generator 218 to generate a response message 312 that may be transmitted to the first device 102-1 using the transmitter 206 of the second device 102-2.

At a second receipt-verification procedure 314, the second device 102-2 may retransmit the response message 312 (illustrated in 300 as another request message 312-M, where M represents an integer value greater than unity that monotonically increases with every retransmission) over a second duration of time, because receipt of the response may not be guaranteed over the wireless communication network. The second device 102-2 may retransmit the response until either the device-to-device communication begins (e.g., a status message is received at the second device 102-2 from the first device 102-1) or the second duration of time has expired. Retransmissions of the response message 312 may be performed continuously, periodically, at predetermined times, or intermittently over the second duration of time based on user needs. The second duration of time may be similar to or distinct from the duration of time. A second timer may also be triggered into an active state upon transmission of the first response message 312-1. The second timer may be used to count time within the second duration of time and remain in the active state until the second duration of time expires or the device-to-device communication begins (e.g., a status message is received from the first device 102-1).

At a second acknowledgment procedure 316, the first device 102-1 may determine that the second device 102-2 supports the device-to-device communication based on, for instance, receiving the response message 312 within the duration of time. Upon making this determination, the first timer may be triggered to the inactive state by the first device 102-1. If the first device 102-1 receives retransmitted response messages (e.g., 312-M) from the second device 102-2, then the first device 102-1 may ignore any additional responses that are similar to a first received response message 312. The first device 102-1 may store device-to-device communication settings of the second device 102-2 on the first device 102-1 (e.g., a CRM 212) for future reference.

In general, the request message 304 and/or the response message 312 may be random, predetermined, encrypted (e.g., encoded for privacy), and/or include information about the transmitting device (e.g., an identifier). While operations associated with the first lifeline of the example handshake procedure 300 are described as performed by the first device 102-1 and operations associated with the second lifeline are described as performed by the second device 102-2, in general, the second device 102-2 may perform the operations of the first lifeline and the first device 102-1 may perform the operations of the second lifeline.

After determining that the second device 102-2 supports the device-to-device communication, the first device 102-1 and the second device 102-2 may begin exchanging status messages during the call. Status messages may include status information regarding one or more of, for example, a condition of the wireless communication network (e.g., a condition of the IMS network), a quality of the call (e.g., audio quality), a health status of one or more devices on a call (e.g., battery level), inputs from a user of a device (e.g., haptic inputs, commands, user settings), custom messages, and so forth. This status information may be determined by a computing device 102 without direct input from a user 126 (e.g., a passive determination from the perspective of a user 126) using, for instance, information exchanged in status messages, analysis of received status messages (performed by the message analyzer 220), information collected by one or more sensors 210, one or more additional modules (not illustrated) of the CRM 212, and so forth. Status information included in status messages may additionally include information regarding one or more of a distorted audio/video signal, an echo, an intermittent audio/video signal, silence, changes in volume or clarity of an audio signal, reduced resolution of a video signal, delayed audio/video (e.g., latency, lag), audio/video interference or static noise, background noise, unintentional user inputs, one or more user settings, user commands, haptic inputs, voice inputs, gesture inputs, stored information that has been selected by the user to share with the other device (e.g., travel information, calendar events), a battery level, active or inactive states of one or more sensors, a mute status of a microphone, a mute status of a speaker, and so forth. The status information may also include an activity of a user (e.g., walking) as determined using an accelerometer, a location of the device as determined by a location sensor, emergency information (e.g., a car crash) as determined by motion sensors, and so forth.

A user 126 of a computing device 102 may be provided with controls allowing the user 126 to make an election as to both if and when systems, applications, and/or features described herein may enable the collection of user information and/or device information (e.g., preferences, stored information, a current location of the device), and if the user 126 is sent content and/or communications from a server. In addition, certain data may be treated in one or more ways before it is stored and/or used so that personally identifiable information is removed. For example, the identity of a user 126 may be treated so that no personally identifiable information can be determined for the user 126. In another example, the geographic location of the user 126 may be generalized where location information is obtained (e.g., to a city, zone improvement plan (ZIP) code, or state level), so that a particular location of a user 126 cannot be determined. Thus, the user 126 may have control over what information is collected, how that information is used, and what information is provided to devices on a call. The information in status messages may also be used by software applications (e.g., a phonebook application) of one or more computing devices 102 to improve a user experience.

In an example, status messages may be exchanged using the device-to-device communication to identify and mitigate call-quality issues. Oftentimes, a user may experience a call-quality issue without understanding a cause of or a solution for the problem. For instance, a call may unexpectedly drop, leaving a user wondering why the call ended and if their device is the source of the issue. Status messages may be exchanged during a call to communicate contextual information regarding connected devices that may address these types of call-quality issues. In the current example, a device may transmit a status message of "low battery" using the device-to-device communication to inform the other device of a low level of battery charge that may result in a dropped call. If the call unexpectedly ends, a user may better understand a cause of the dropped call from the information transmitted in the status message (e.g., the other device lost power due to an insufficient level of battery charge).

Status messages may be transmitted at any time (e.g., periodically, at predetermined times, intermittently) by a transmitter 206 of a computing device 102 using the device-to-device communication upon instruction from the message module 214. Status messages may be generated by the message generator 218 and may be encrypted to prevent a third party (e.g., an entity distinct from the first device 102-1 and the second device 102-2) from accessing the status information of a device. Computing devices 102 may also receive status messages at any time at a receiver 208 of a computing device 102. A message analyzer 220 may decode an encrypted message, translate information in a status message, and/or perform analysis procedures to understand the information in a status message.

In an example, the first device 102-1 detects a change in a battery charge level of the device, and a processor 204 instructs the message module 214 to communicate this change in status information of the first device 102-1 to the connected second device 102-2 during the call using the device-to-device communication. The message generator 218 of the first device 102-1 may generate a status message (e.g., of "low battery") to inform the second device 102-2 that the first device 102-1 has a low level of battery charge.

The first device 102-1 may encrypt this status message to be transmitted by the transmitter 206 to the second device 102-2. The second device 102-2 may receive the encrypted message using a receiver 208, and a message analyzer 220 of the second device 102-2 may decode the message and determine the first device 102-1 has a low battery.

A disabling process 318 may be performed if the second device 102-2 does not support the device-to-device communication. At a dismissal procedure 320, the second device 102-2 may ignore the request message(s) 304 from the first device 102-1. Even if the second device 102-2 is capable of supporting the device-to-device communication, a user 126 (e.g., the second user 126-2) may have disabled the feature on the second device 102-2. In this case, the second device 102-2 may still ignore the request message 304 as illustrated at the dismissal procedure 320.

At a time-verification procedure 322, the first device 102-1 determines that the duration of time has expired (e.g., using the timer) and a response message 312 has not been received from the second device 102-2. Based on this determination, the first device 102-1, at a third acknowledgment procedure 324, may determine that the second device 102-2 does not support the device-to-device communication and may disable or refrain from the exchange of status messages during a call. The device-to-device communication feature may be disabled temporarily during this call and/or during future calls with the second device 102-2 using, for instance, stored settings of the second device 102-2 on the CRM 212 of the first device 102-1. This feature may be enabled again, for instance, when establishing a device-to-device communication with a third device.

Request messages 304, response messages 312, and status messages may utilize a message header (e.g., using RTP header extensions) and/or unused DTMF digits (e.g., digits of A-D). Using a message header or unused DTMF digits, the operations of the example handshake procedure 300 may be performed without modifying any existing standards (e.g., mechanical, software, network) and/or without requiring any changes to a carrier infrastructure (e.g., LTE. 5G NR, or wireless local area network). Furthermore, status messages may be exchanged between devices without being modified or blocked by a carrier network that operates a telecommunication system.

In an example, the device-to-device communication and handshake procedure may be performed using a message header that includes at least one RTP header extension. According to standards and specifications set by a 3GPP for telecommunication systems, many computing devices 102 support RTP data packets for delivering audio and video information over IP networks. An IMS network, for instance, may allow for multimedia services (e.g., calls, texts. RTP messages) to be delivered to another device using an IP network. In this example, the IMS network enables RTP data packets to be delivered from a first computing device (e.g., the first device 102-1) to a second computing device (e.g., the second device 102-2). RTP data packets may provide end-to-end network transport functions that enable real-time data transmission between computing devices 102 (e.g., media streaming, teleconference applications, and so forth). The operation of transmitting data using an RTP data packet may include structuring data into a data packet to enable quick delivery across an IP network. After receipt of the data packet, the data is reassembled into a smooth-flowing stream of data for a recipient computing device. The RTP data packet may include an RTP header that informs the recipient computing device of how to reassemble the data. The RTP header may include, for example, a header extension, a version of a protocol, padding bytes, contributing source identifications, markers, payload type information, sequence numbers, timestamps, and so forth.

RTP specifications require the recipient computing device to ignore RTP headers that are not understood. Since RTP headers carry independent information (e.g., distinct from an RTP payload), ignoring the RTP header does not affect the processing, decoding, or encoding of data (e.g., audio data, video data). Messages (e.g., including status information) may be included in an RTP header extension as a technique for transmitting data between computing devices 102. In the example handshake procedure 300, the first device 102-1 may transmit a request message 304 using an RTP header extension (e.g., an RTP request). The RTP request may include one or more bits of information including, for example, an identifier (ID), a length of the information, and data. Since delivery of RTP requests may not be guaranteed over a wireless communication network, the first device 102-1 may retransmit the RTP request over a duration of time (e.g., every 20-40 ms depending on bundling). If a response message 312, which uses an RTP header extension (e.g., an RTP response), is received at the first device 102-1 within the duration of time, then the first device 102-1 may refrain from retransmitting the RTP request. In some cases. RTP header extensions may be prioritized as a primary technique for exchanging status messages with respect to, for instance, unused DTMF digits.

Figure 4:
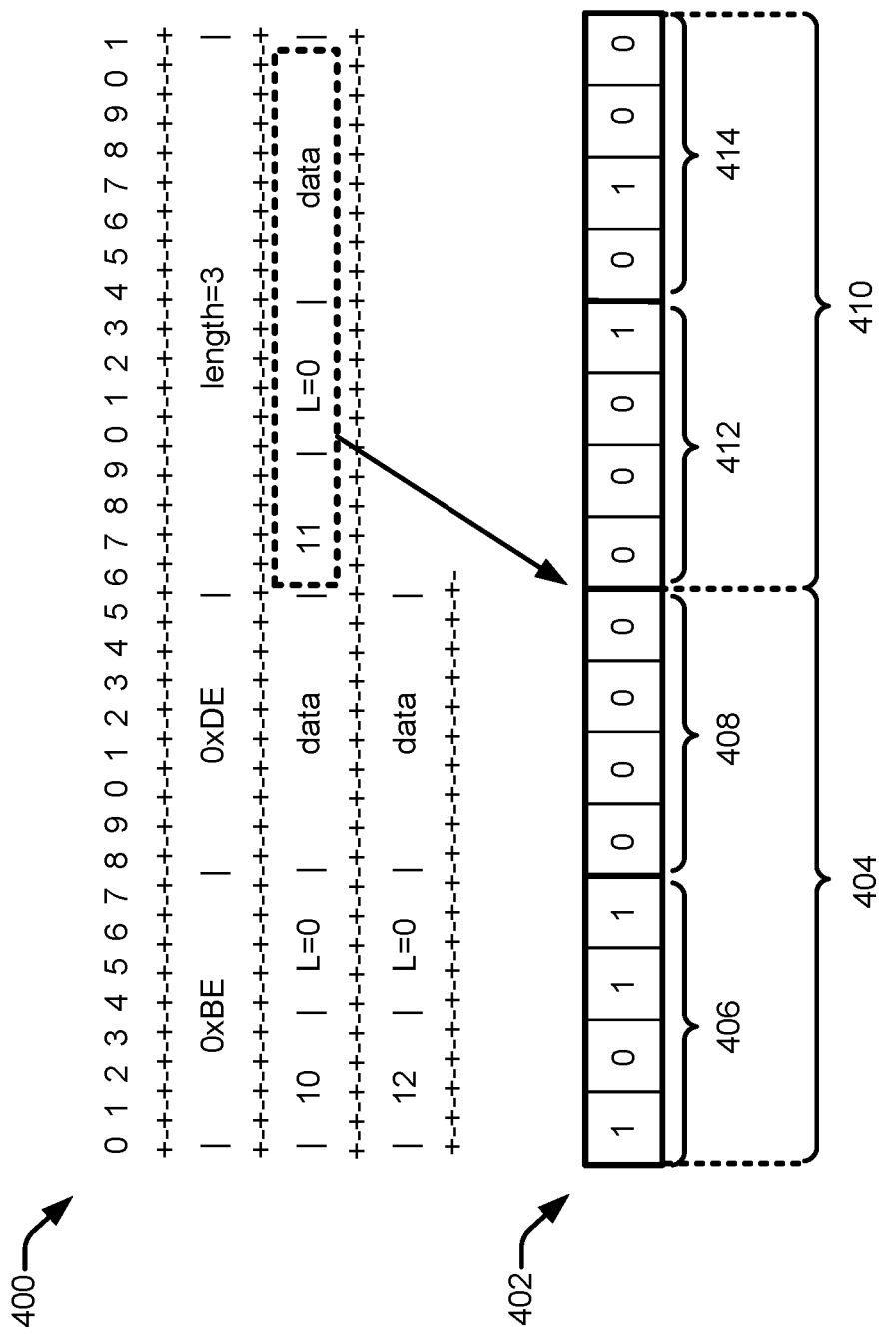
FIG. 4 illustrates an example RTP header extension that may be used during a device-to-device communication to exchange one or more status messages.

FIG. 4 illustrates an example RTP header extension 400 that may be used during a device-to-device communication to exchange one or more status messages. Status messages exchanged using RTP header extensions are herein referred to as RTP messages, for short. RTP messages may be exchanged in real time over the wireless communication network. FIG. 4 illustrates an example RTP header extension 400 and an example RTP extension payload 402. According to Internet Standards documented by a Request for Comments (RFC) 5285, a one-byte header extension may include a 16-bit profile-specific identifier labeled as a "defined by profile" that takes a fixed bit pattern of 0xBEDE (illustrated in 400 as "0xBE" and "0xDE") and a 16-bit length specifier (illustrated in 400 as "length=3") that indicates the length of the extension in 32-bit units. In general, RTP extension payloads may include a 4-bit identification (ID) that includes values in a valid range of 1-14 inclusive, a 4-bit length that indicates a number of bytes (e.g., containing 8 bits) of data, and optional padding (not shown).

In the example RTP header extension 400, the first ID is labeled "10." the second ID is labeled "11." and the third ID is labeled "13." These IDs may correspond to distinct categories of status information to be included in one or more RTP messages during the device-to-device communication. For example, the ID labeled "11" in 400 may represent information regarding a current status of a device on a call (e.g., battery level, network coverage). While the example RTP header extension 400 illustrates three IDs, in general, an RTP header extension may include 1-14 IDs, where every ID may represent a distinct category of status information associated with one or more RTP messages exchanged with another device on a call.

The length of data associated with every ID illustrated in the example RTP header extension 400 is specified by "L=0." which indicates a length of zero. These lengths, however, correspond to an actual length of data, measured in units of bytes, minus one byte. For instance, "L=0" indicates an actual length of 1 byte of data. Additionally. "L=15" (the maximum length permitted by RFC 5285 standards) indicates 16 bytes (16 units of 8 bits corresponding to 128 bits in total) of data. Since the actual length of data in 402 is 1 byte, the data is illustrated as an 8-bit array. While not illustrated in FIG. 4. RTP header extensions may include padding used to fill up a block of a certain size, which may be required by an encryption algorithm.

During the device-to-device communication. RTP header extensions may contain information about connected computing devices 102 on a call, for example, using 2-byte arrays as illustrated in the example RTP extension payload 402 of FIG. 4. The first byte 404 includes a 4-bit ID 406 and a 4-bit length 408, while the second byte 410 includes 8 bits of data. The example RTP extension payload 402 includes a 2-byte array of [1011 0000 0001 0100], where the first quartet (e.g., the 4-bit ID 406) includes an array of [1011], which indicates that the status message refers to a device status. The second quartet (e.g., the 4-bit length 408) includes an array of [0000], which refers to a payload length of 1 byte associated with data. The third quartet includes an array of [0001], which represents a sequence number 412 that monotonically increases, for example, with every transmission of a new RTP message during a call. The fourth quartet includes an array of [0100], which may represent message data 414 that indicates "low battery" of the computing device 102.

The sequence number 412 may be randomly chosen at the start of a device-to-device communication (e.g., in a first RTP message) to enhance security of the status information exchanged using the example RTP extension payload 402. Sequence numbers 412 may be independently maintained by a computing device 102 on a call. RTP messages may be retransmitted over a period of time, similar to the techniques described with reference to the first receipt-verification procedure 306 and the second receipt-verification procedure 314. In particular, a message timer of the first device 102-1 may be triggered to an active state by the message module 214 upon transmitting a first RTP message to the second device 102-2. The RTP message may be retransmitted over the period of time (e.g., periodically every 20-40 ms, sporadically, continuously, upon being triggered) with, for instance, the same sequence number 412 until the period of time expires and the message timer switches back to the inactive state. During this period of time, new RTP messages (e.g., updates) may not be transmitted to the second device 102-2. When updated RTP messages are transmitted, the sequence number 412 may be increased monotonically with respect to a sequence number 412 of a prior RTP message. If an RTP message with an older sequence number 412 is received (e.g., a lower value of the sequence number 412 with respect to a highest value received at a current time), then that RTP message may be ignored.

Generally, and as depicted in 402, bits of information in an RTP extension payload may include values of 1 or 0 which may represent logical values of two possible states (e.g., yes/no, true/false, high-voltage/low-voltage). The message data 414 of the example RTP header extension 400, for instance, may include up to $2^4=16$ distinct RTP messages for the given 4-bit ID 406 and 4-bit length 408. RTP header extensions are optional and may be transmitted, for instance, based on user needs (e.g., when a status of a device changes at a current time with respect to the status of the device at a prior time).

In an example, the first device 102-1 may transmit RTP messages to the second device 102-2 in an RTP header extension similar to 400, which includes three RTP extension payloads (e.g., corresponding to IDs "10," "11," and "12" as illustrated in FIG. 4) and three RTP messages (one message for each RTP extension payload, given "L=0)"). A first RTP message, corresponding to ID "10." may indicate "LTE." which refers to a type of Radio Access Technology (RAT) utilized by the first device 102-1. A second RTP message, corresponding to ID "11." may indicate "good network coverage." which refers to a condition of the wireless communication network. A third RTP message, corresponding to ID "12." may indicate a custom message.

At a later time in this example, an updated RTP header extension (e.g., containing updated RTP messages) is transmitted from the first device 102-1 to the second device 102-2. This time, however, an updated first RTP message is not included because the type of RAT used by the first device 102-1 has not changed, and an updated third RTP message is also not included again due to a lack of new custom messages. An updated second RTP message, corresponding to ID "11." however, is included and indicates "poor network coverage" due to a change in the quality of the network coverage at this later time with respect to a prior time. Therefore, the updated RTP header extension, which includes the updated second RTP message may be modified to "length=1." which indicates a single RTP extension payload (e.g., for ID="11"). In this example, the updated RTP header extension only includes status information that has changed at a current time relative to status information transmitted in an RTP header extension at a prior time.

An exchange of messages during a call is not limited to message headers that include RTP header extensions. The device-to-device communication and handshake procedure may be performed using unused DTMF digits. The standards and specifications set by 3GPP for telecommunications systems also indicate that many computing devices 102 may negotiate and support a use of DTMF signaling using fifteen digits (0-9, *, #, A, B, C, and D). While a user 126 may be restricted by only twelve digits (0-9, *, and #) on a keypad of a computing device 102, the additional unused DTMF digits A-D may be available for device-to-device communication during a call.

In the example handshake procedure 300, the first device 102-1 transmits one or more request messages 304 using one or more unused DTMF digits. Requests may include, for example, a parameter identifier and a parameter value. Parameter identifiers may include base 3 encoded version numbers represented by digits A and/or B, which are terminated by digit D. Parameter values, for instance, may communicate a protocol version supported by the first device 102-1 to the second device 102-2. Digits A-C may be used in combination to identify a protocol version, while digit D identifies the termination of the parameter value. For example, the first device 102-1 transmits "AD" in a request message 304 to the second device 102-2 to communicate an IP version 1.0 supported by the first device 102-1. If the first device 102-1 determines that the second device 102-2 supports the device-to-device communication using unused DTMF digits, then the first device 102-1 may transmit combinations of letters A-D to communicate status information to the second device 102-2 during the call as further described with reference to FIG. 5.

Figure 5:
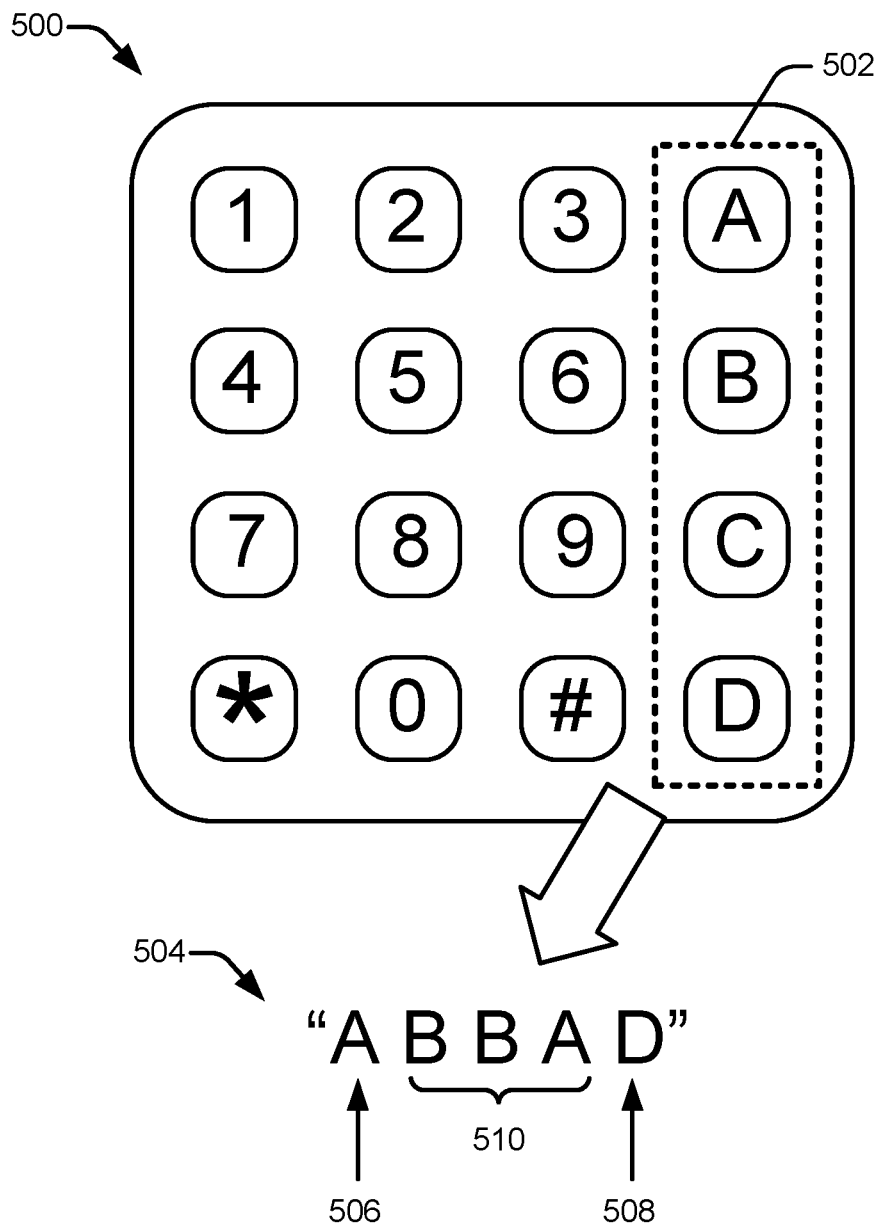
FIG. 5 illustrates an example status message that may be exchanged during a call using unused DTMF digits.

FIG. 5 illustrates an example status message that may be exchanged during a call using unused DTMF digits. The example DTMF digits 500 depicted in FIG. 5 represent DTMF digits that may be available on a computing device 102, which includes unused DTMF digits 502 of A-D. An example DTMF message 504 of "ABBAD" includes a DTMF identifier 506 of "A" in the first digit position to identify a start of the message and a DTMF termination 508 of "D" in the fifth digit position to identify an end of the message. The second, third, and fourth digits may form a DTMF data array 510, generalized by [XYZ], where X may represent a parameter category. Y may represent a parameter type, and Z may represent a parameter value. The DTMF message 504 of "ABBAD" includes a DTMF data array 510 of "BBA." where X="B" may refer to a device status. Y="B" may refer to a network coverage, and Z="A" may refer to a quality of poor. Therefore, the DTMF message of "ABBAD" indicates a device is experiencing poor network coverage. While the DTMF messages described herein have a length of five digits, in general, DTMF messages may include any number of digits less than or greater than five to form alternative arrays (e.g., an array of A[X]D, an array of A[UVWXYZ]D, and so forth). Additionally, individual digits of a DTMF message may be transmitted in accordance with a timing interval that takes carrier requirements into consideration.

When a computing device 102 transmits a DTMF message to another device on a call, the DTMF message or aspects thereof (e.g., a subset of digits of the DTMF message) may be retransmitted over a period of time, similar to techniques described with reference to RTP header extensions. In particular, a message timer of the first device 102-1 may be triggered to an active state by the message module 214 upon transmitting a first DTMF message to the second device 102-2. Retransmitted DTMF messages may include the DTMF data array 510, for instance, without the DTMF identifier 506 or DTMF termination 508. DTMF data arrays 510 may be retransmitted over the period of time (e.g., periodically every 20-40 ms, sporadically, continuously, upon being triggered), for instance, until the period of time expires and the message timer switches back to the inactive state. To end the DTMF message (e.g., upon detecting the inactive state of the timer), for instance, the DTMF termination 508 may be transmitted. During the period of time, new DTMF messages (e.g., updates) may not be transmitted to the second device 102-2. If the second device 102-2 does not receive additional digits (e.g., digits of a DTMF data array 510) between the receipt of a DTMF identifier 506 and receipt of a DTMF termination 508 or does not receive digits in a format (e.g., an array) recognized by the device, then the second device 102-2 may ignore these received digits. If unused DTMF digits are used to exchange status messages during a call, then both devices may refrain from playing a tone associated with the DTMF digits A-D to improve a user experience. The unused DTMF digits may be prioritized as a secondary technique for exchanging status messages, with respect to RTP header extensions, to prevent congestion of a wireless communication network as further described with respect to FIG. 6.

Figure 6:
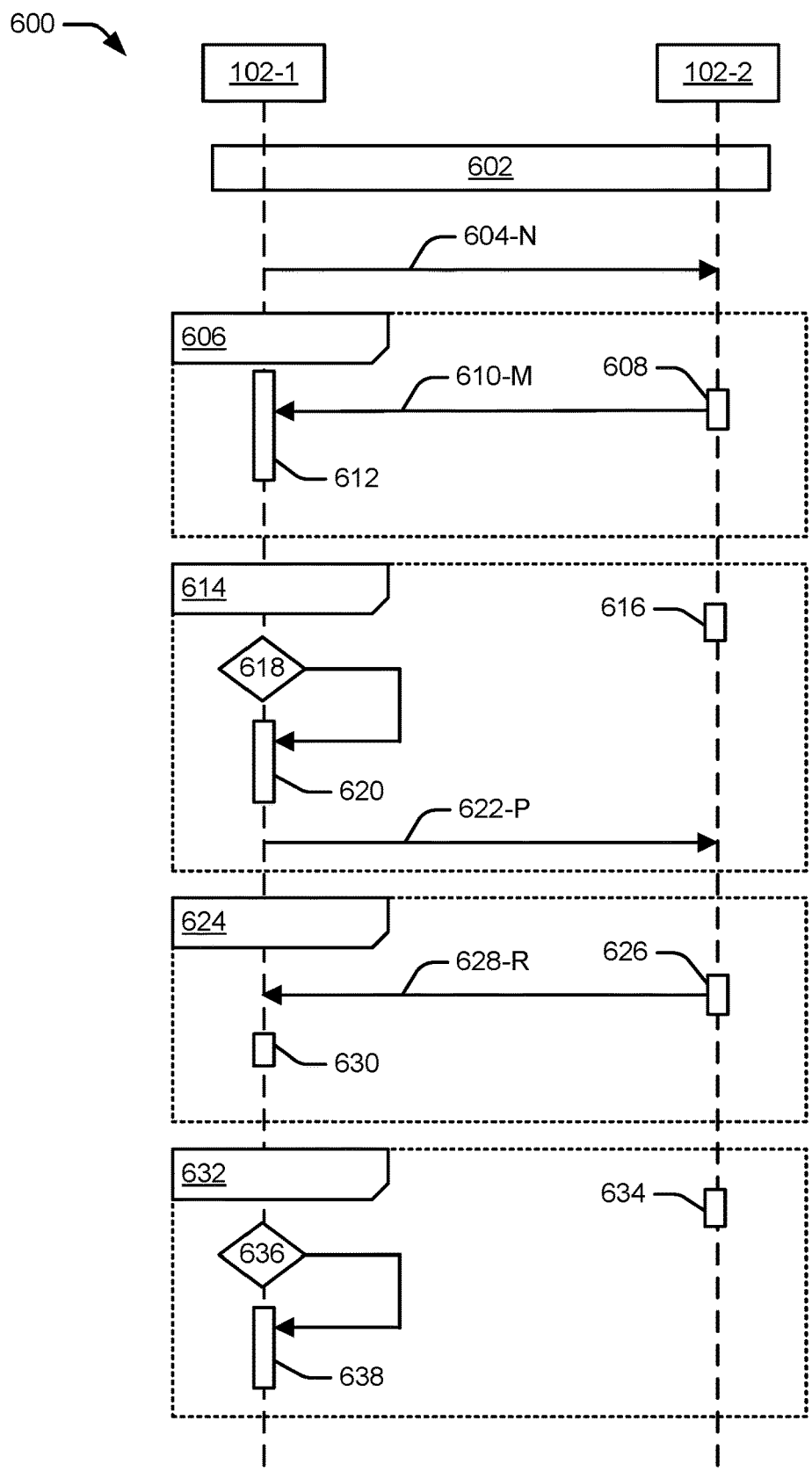
FIG. 6 illustrates an example fallback protocol sequence that may be used to establish a device-to-device communication during a call using RTP header extensions and/or unused DTMF digits.

FIG. 6 illustrates an example fallback protocol sequence 600 that may be used to establish a device-to-device communication during a call using RTP header extensions and/or unused DTMF digits. The sequence 600 provides contingency (e.g., fallback) protocols for computing devices 102 during a call. The sequence 600 is illustrated as a set of operations (or acts) performed by a system that includes the first device 102-1 and the second device 102-2. One or more of these computing devices 102 may utilize a respective message module 214 of that computing device 102 to enable the operations shown. The example fallback protocol sequence 600 is not limited to the operations shown and may be rearranged, repeated, or eliminated as needed to enable the techniques described herein. Two lifelines are depicted in the example fallback protocol sequence 600 in which operations performed by the first device 102-1 are at least partially oriented about or emanate from the first lifeline and operations performed by the second device 102-2 are at least partially oriented about or emanate from the second lifeline. The sequence 600 may be performed by a message initializer 216 of the respective message modules 214 of both devices. Sequence 600 is similar to the example handshake procedure 300 of FIG. 3, except in the ways described below.

At a network-connection procedure 602, the first device 102-1 and the second device 102-2 establish a connection (e.g., using a wireless link 110) to a wireless communication network using one or more base stations (e.g., base station 104), a common server, a peer-to-peer network, and/or a client-server model. The base station 104 may enable connection to the core network 112 (e.g., an IMS network connection). A real-time person-to-person media session (a call) may also be established between the first device 102-1 and the second device 102-2.

The first device 102-1 may transmit a request message 304 using a message header that includes an RTP header extension (e.g., an RTP request 604-N, where N represents an integer value that monotonically increases with every retransmission). Though not depicted, this RTP request 604-N may be retransmitted as described with reference to FIG. 4 within a duration of time. Upon transmitting the RTP request 604-N, for instance, a first timer (e.g., used to count the duration of time) may be triggered to an active state. The first timer may remain in the active state until either an RTP response is received from the second device 102-2 or the duration of time expires.

In the example fallback protocol sequence 600, an RTP response process 606 is performed, if the second device 102-2 supports the device-to-device communication using RTP header extensions. At a first acknowledgment procedure 608, the second device 102-2 may determine that the first device 102-1 supports the device-to-device communication using RTP header extensions, for instance, based on receiving the RTP request 604-N. The second device 102-2 may also transmit an RTP response 610-M (where M represents an integer value that monotonically increases with every retransmission during a second duration of time as measured by a second timer) to the first device 102-1, which is similar to or distinct from the RTP request 604-N. At a second acknowledgment procedure 612, the first device 102-1 may determine that the second device 102-2 supports the device-to-device communication using RTP header extensions based on, for instance, receiving the RTP response 610-M within the duration of time. Upon making this determination, for instance, the first timer may be triggered to the inactive state by the first device 102-1, and the first device 102-1 may also begin exchanging status messages with the second device 102-2 during the call using RTP header extensions.

An RTP disabling process 614 may be performed if the second device 102-2 does not support the device-to-device communication using RTP header extensions. At an RTP dismissal procedure 616, the second device 102-2 may ignore the RTP request 604-N and any retransmitted request received from the first device 102-1. At a time-verification procedure 618, the first device 102-1 may determine that the duration of time has expired (e.g., using the first timer) and an RTP response 610-M has not been received. Based on this determination, the first device 102-1, at a third acknowledgment procedure 620, may determine that the second device 102-2 does not support the device-to-device communication using RTP header extensions (or a user has disabled the feature on their local device) and may disable or refrain from the exchange of status messages using RTP header extensions. The first device 102-1 may then transmit a request message 304 that includes unused DTMF digits (e.g., a DTMF request 622-P, where P represents an integer value that monotonically increases with every retransmission). Though not depicted, this DTMF request 622-P may be retransmitted as described with reference to FIG. 5 within a third duration of time. Upon transmitting the DTMF request 622-P, for instance, a third timer (e.g., used to count a third duration of time) may be triggered to an active state. The third timer may remain in the active state until either a DTMF response is received by the first device 102-1 or the third duration of time expires.

In the example fallback protocol sequence 600, a DTMF response process 624 may be performed, if the second device 102-2 supports the device-to-device communication using unused DTMF digits. At a fourth acknowledgment procedure 626, the second device 102-2 may determine that the first device 102-1 supports the device-to-device communication using unused DTMF digits, for instance, based on receiving the DTMF request 622-P. The second device 102-2 may also transmit a DTMF response 628-R (where R represents an integer value that monotonically increases with every retransmission during a fourth duration of time as measured by a fourth timer) to the first device 102-1, which is similar to or distinct from the DTMF request 622-P. At a fifth acknowledgment procedure 630, the first device 102-1 may determine that the second device 102-2 supports the device-to-device communication using unused DTMF digits based on, for instance, receiving the DTMF response 628-R within the third duration of time. Upon making this determination, the third timer may be triggered to the inactive state, and the first device 102-1 may begin exchanging status messages with the second device 102-2 during the call using unused DTMF digits.

A DTMF disabling process 632 may be performed if the second device 102-2 does not support the device-to-device communication using unused DTMF digits. At a DTMF dismissal procedure 634, the second device 102-2 may ignore the DTMF request 622-P and any retransmitted request from the first device 102-1. At a second time-verification procedure 636, the first device 102-1 may determine that the third duration of time has expired (e.g., using the third timer) and a DTMF response 628-R has not been received from the second device 102-2. Based on this determination, the first device 102-1, at a sixth acknowledgment procedure 638, may determine that the second device 102-2 does not support the device-to-device communication using unused DTMF digits and may disable or refrain from the exchange of status messages using unused DTMF digits.

The device-to-device communication may be disabled at any time by a computing device 102 if incompatibility conditions arise including, for example, an emergency call, a solicitor call, a conference, an active state of a single radio voice continuity (SRVCC) is detected, and so forth. In these instances, the other connected device (e.g., a landline phone of an emergency operator) often does not support an exchange of status messages during a call and may not benefit from the techniques described herein.

The handshake procedure illustrated in FIG. 3 may also be simplified if both devices (e.g., the first device 102-1 and the second device 102-2) are on a shared server. In this case, the first device 102-1 connects to a shared server and determines that the second device 102-2 is also connected to the shared server. The two devices may begin exchanging status messages over the shared server.

Figure 7:
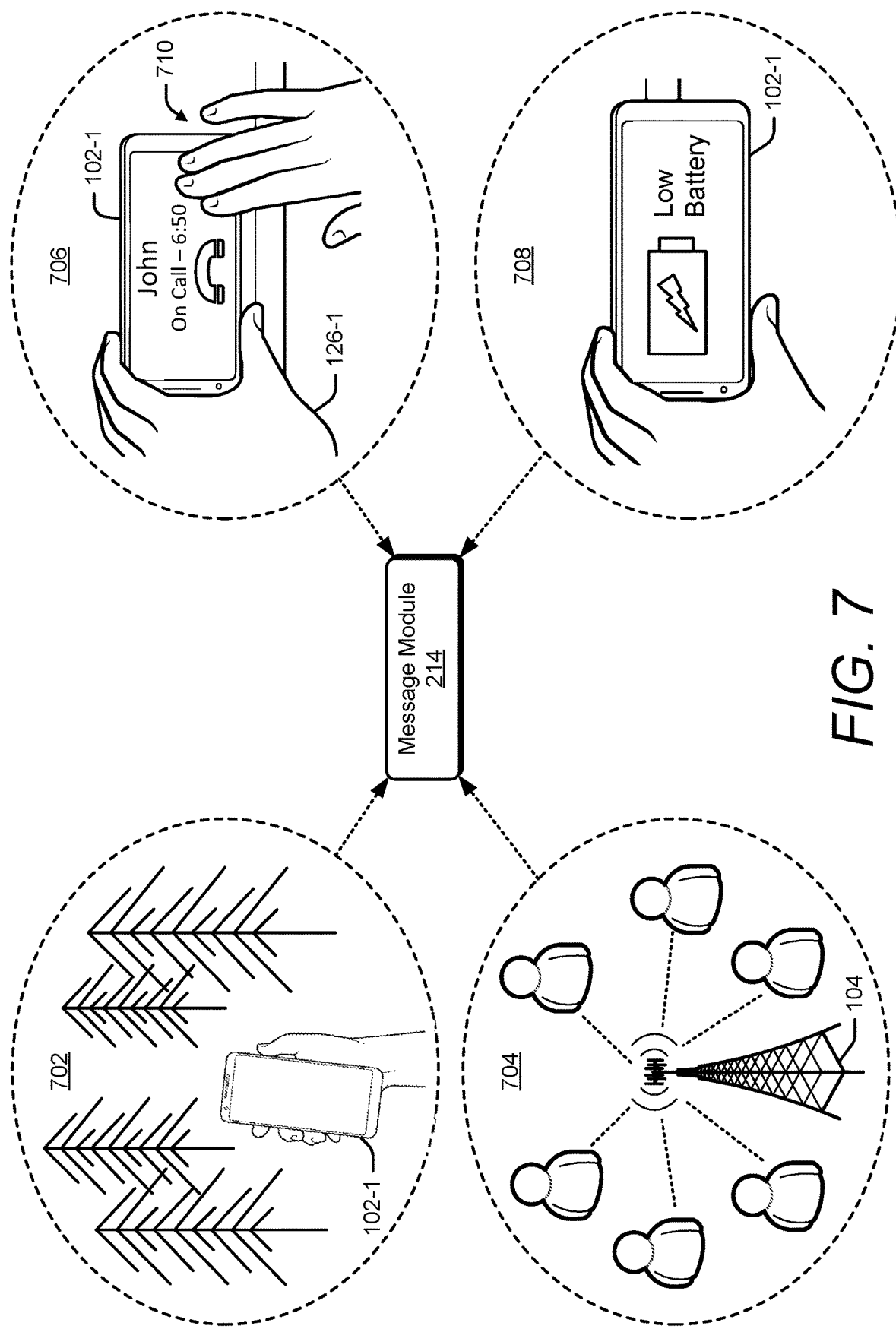
FIG. 7 illustrates example status information that may be included in a status message.

FIG. 7 illustrates example status information that may be included in a status message. Examples of status information are illustrated at example environments 702, 704, 706, and 708, which may be used by the message module 214 to generate a message to be exchanged with another device on a call. Status information may be linked to other applications or programs on the computing device 102 (e.g., shared with a phonebook application, messaging application, and so forth).

At example environment 702, the first device 102-1 has been moved to a remote location (e.g., a forest), far from a base station (e.g., 104), during a call with the second device 102-2, resulting in a poor connectivity of the first device 102-1. The message module 214 may transmit status information regarding the poor connectivity of the first device 102-1 to the second device 102-2 in a status message.

At example environment 704, a base station 104 is connected to a large number of user devices, resulting in a congested network. When the first device 102-1 establishes a network connection using this base station 104, one or more call-quality issues may occur, resulting in, for instance, latency of audio/video content or a dropped call. Based on inputs from, for instance, sensors 210 regarding a current quality of the wireless communication network, the message module 214 may determine a status message to be exchanged with another device upon establishing a call over the congested network that includes the network quality information.

At example environment 706, the first user 126-1 is on a call with the second user 126-2 (e.g., John), and the first user 126-1 begins to unintentionally distort the audio of the call by partially covering a microphone 710 of the first device 102-1 with their hand. For example, a sensor 210 (e.g., a touch sensor, a radar sensor, an ultrasonic sensor, an ambient light sensor) of the first device 102-1 may detect this occlusion of the microphone 710 and the message module 214 may generate one or more status messages to communicate this status information to the second device 102-2 to enable the second device 102-2.

At example environment 708, the first device 102-1 has a low battery that may result in a dropped call with the second device 102-2. Based on inputs (e.g., battery level charge information) to the message module 214 of the first device 102-1, the message generator 218 may generate a status message to be exchanged with the second device 102-2 to communicate the low battery of the first device 102-1.

Status information to be included in one or more status message is not limited to the examples depicted in FIG. 7, and additional examples are described below. In an example (not depicted), the message module 214 may receive status information that indicates the first user 126-1 is at their designated workplace during working hours as determined by one or more sensors 210 of the computing device 102. The message generator 218 may generate a status message to be exchanged with another device to communicate that the first user 126-1 is busy at work. In another example (not depicted), the message module 214 may receive status information that indicates the first user 126-1 is at their home in London during regular sleeping hours. The message generator 218 may generate a status message to be exchanged with another device to communicate that it is "bedtime in London." In an additional example (not depicted), the message module 214 may receive status information that indicates the first user 126-1 is scheduled to have lunch with their family at 2:00 pm based on a stored calendar event in an application of the first device 102-1. The message generator 218 may generate a status message to be exchanged with another device to communicate that the first user 126-1 is having lunch with their family. To protect the status information of a user 126, privacy settings are described with respect to FIG. 8.

Figure 8:
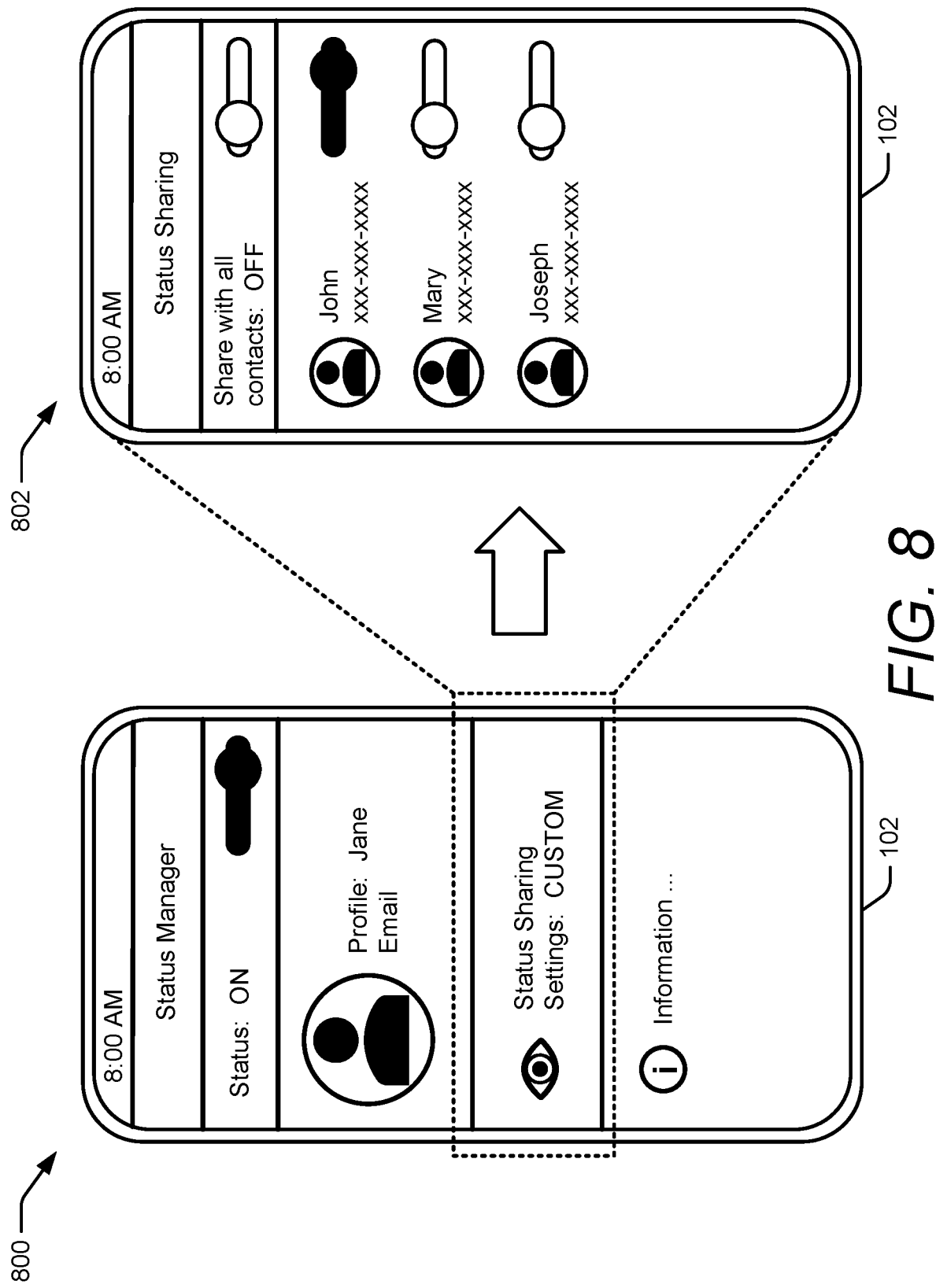
FIG. 8 illustrates example status-sharing controls of the message module that permit user selection of privacy options.

FIG. 8 illustrates example status-sharing controls of the message module 214 that permit user selection of privacy options. At example environment 800, the message module 214 provides an option for users to opt in or out of the device-to-device communication. If a user 126 opts out, a dismissal procedure 318 may be performed by a computing device 102 if another connected device attempts to establish a device-to-device communication. If the user 126 opts into the device-to-device communication, then the user 126 may be provided with additional controls to modify the information shared with the other device. At example environment 802, the user 126 may custom select information shared with contacts during the call. If the user 126 opts out of sharing information with all contacts (as illustrated in 802), then the user 126 may customize their sharing settings for individual contacts. For example, the user 126 may select specific contacts (e.g., John) with whom to share information during a call. Though not depicted, the user 126 may also be provided with controls to monitor the information collected by the message module 214 and set preferences for information stored on the computing device 102 over time.

Techniques for exchanging status messages during a call are not limited to the examples illustrated in FIGS. 1 to 8. These techniques are more generally described with respect to FIG. 9.

Example Methods

Figure 9:
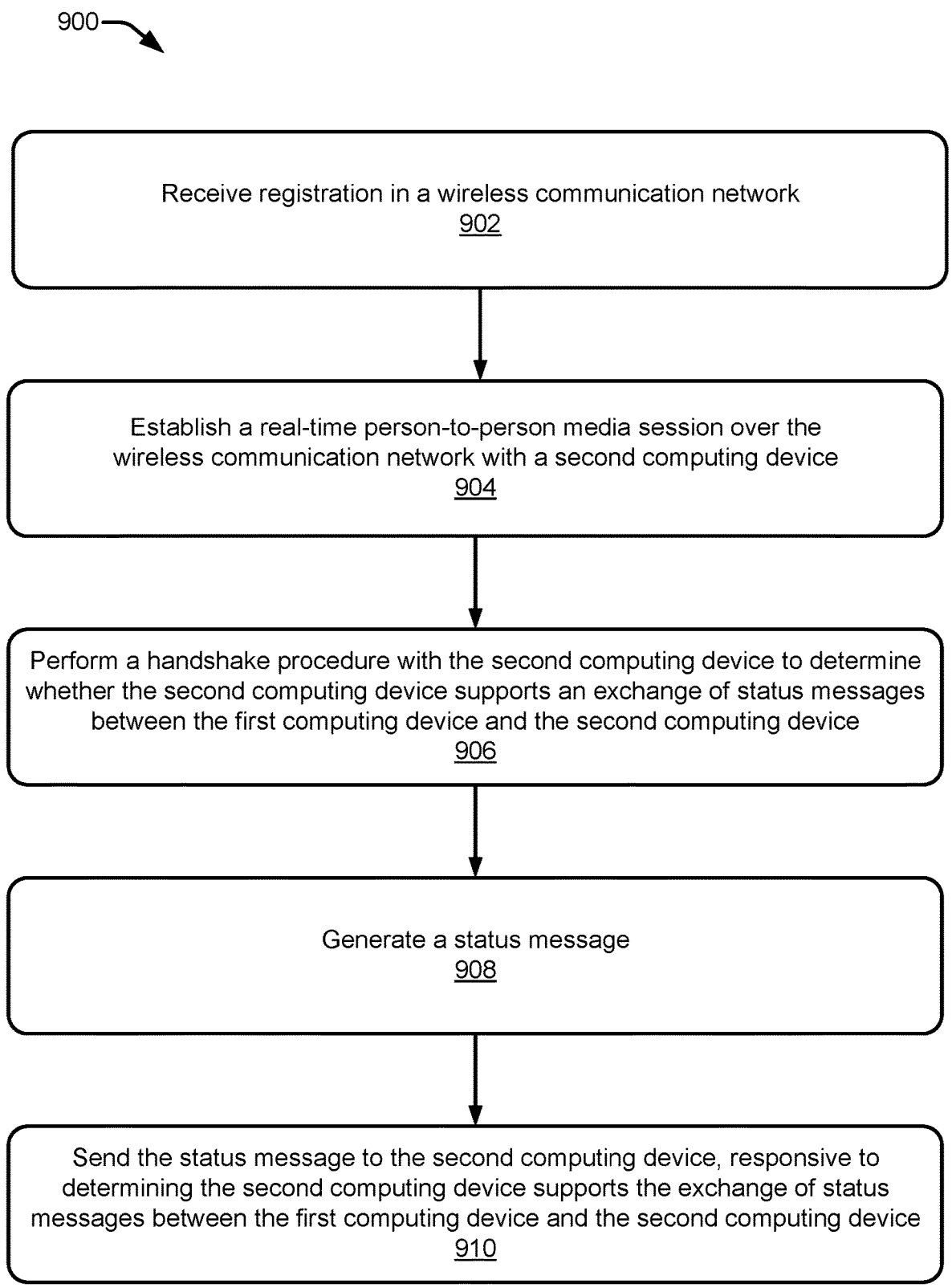
FIG. 9 illustrates an example method, performed by a first computing device, for exchanging status messages during a call, in accordance with techniques and computing devices of this disclosure.

FIG. 9 illustrates an example method 900, performed by a first computing device, for exchanging status messages during a call, in accordance with techniques and computing devices of this disclosure. Method 900 is shown as sets of operations (or acts) performed and is not necessarily limited to the order or combinations in which the operations are shown herein. Furthermore, any of one or more of the operations may be repeated, combined, reorganized, or linked to provide a wide array of additional and/or alternative methods. In portions of the following discussion, reference may be made to environments and entities detailed in FIGS. 1-6 reference to which is made for example only. Techniques are not limited to performance by one entity or multiple entities operating on one computing device 102.

At 902, a first computing device receives registration in a wireless communication network. For example, the first device 102-1 receives registration in a wireless communication network to establish a network connection (e.g., using wireless links 110) to a core network 112 using base stations 104 as depicted in the example environment 100 of FIG. 1. The core network 112 may include IMS network supporting services that may interface with other networks for voice, images, videos, texts, messaging, and the like.

At 904, the first computing device establishes a real-time person-to-person media session over a wireless communication network with the second computing device. For example, the first device 102-1 establishes a call over an IMS network with the second device 102-2. The call may be established, for example, responsive to receiving registration in the IMS network, as described with reference to the call-connection procedure 302-2 of FIG. 3.

At 906, the first computing device performs a handshake procedure with the second computing device to determine whether the second computing device supports an exchange of status messages between the first computing device and the second computing device. For example, the first device 102-1 performs the example handshake procedure 300 illustrated in FIG. 3 to determine whether the second device 102-2 supports an exchange of status messages during a call. The handshake procedure may be performed by a computing device 102 using RTP header extensions to determine whether another device supports exchanging status messages using RTP header extensions. The handshake procedure may also be performed by a computing device 102 using unused DTMF digits of A-D to determine whether the other device supports exchanging status messages using unused DTMF digits.

At 908, the first computing device generates a status message. For example, the first device 102-1 generates a status message using a message generator 218 of a message module 214. Status messages may be generated using, for instance, RTP header extensions and/or unused DTMF digits of A-D. Status messages may include real-time status information regarding one or more of, for example, a condition of the wireless communication network, a quality of the call, a health status of one or more devices on a call, inputs from a user, custom messages, and so forth.

At 910, the first computing device sends the status message to the second computing device responsive to determining the second computing device supports the exchange of status messages between the first computing device and the second computing device. For example, the first device 102-1 transmits the status message to the second device 102-2 through the IMS network using a transmitter 206. The status message is transmitted to the second device 102-2 to enable the second device 102-2 to mitigate call-quality issues (e.g., audio disturbance) of the call.

Example Computing Systems

Figure 10:
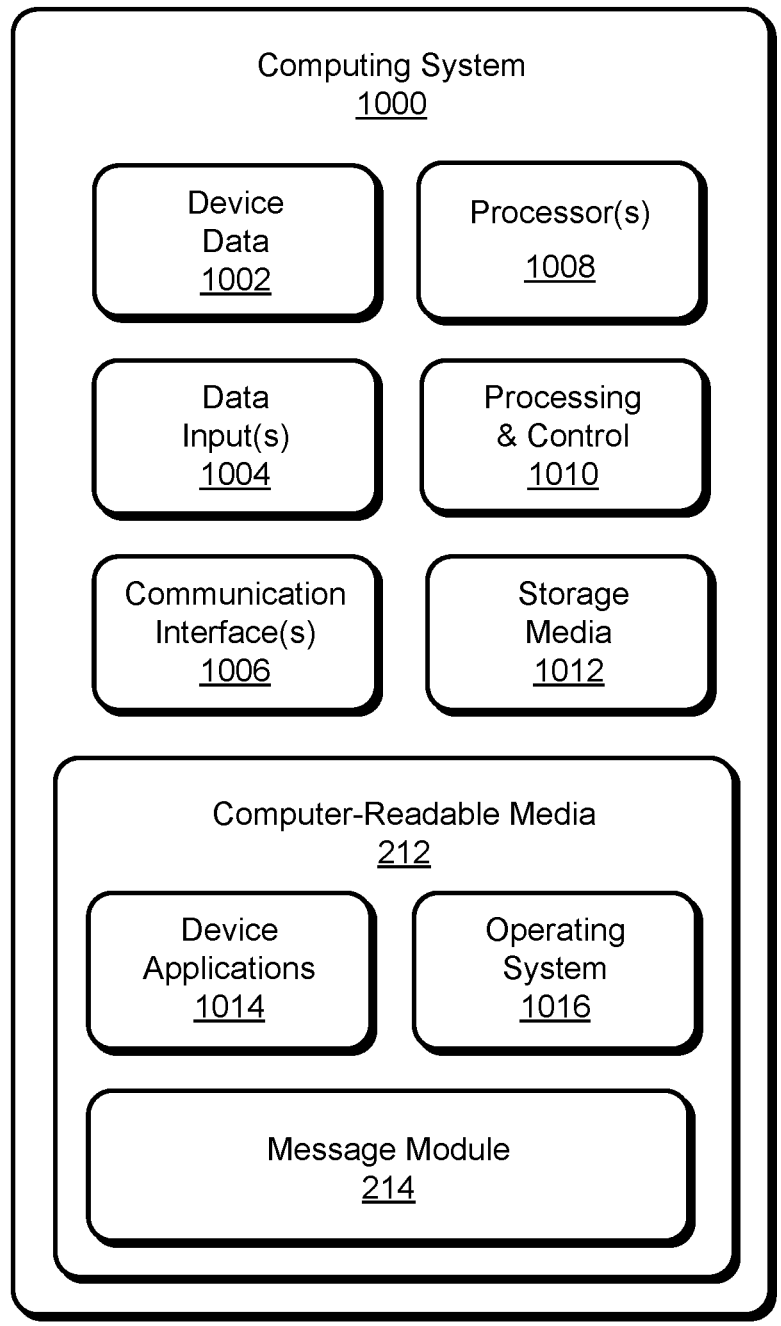
FIG. 10 illustrates an example computing system embodying, or in which techniques can be implemented that enable use of, techniques of exchanging status messages during a call.

FIG. 10 illustrates an example computing system 1000 embodying, or in which techniques can be implemented that enable use of, techniques of exchanging status messages during a call. The example computing system 1000 may be implemented as any type of client, server, and/or computing device as described with reference to FIG. 2.

The computing system 1000 may include device data 1002 (e.g., received data, data that is being received, data scheduled for broadcast, data packets of the data). The device data 1002 or other device content may include configuration settings of the device, media content stored on the device, and/or information associated with a user of the device. Media content stored on the computing system 1000 may include any type of audio, video, text, and/or image data. The computing system 1000 may include one or more data inputs 1004 by which any type of data, media content, and/or inputs can be received, including user-selectable inputs (explicit or implicit), messages, music, television media content, recorded video content, and any other type of audio, video, text, and/or image data received from any content and/or data source.

The computing system 1000 may also include communication interfaces 1006, which may be implemented as any one or more of a serial and/or parallel interface, a wireless interface, any type of network interface, a modem, and any other type of communication interface. The communication interfaces 1006 provide a connection and/or communication links between the computing system 1000 and a communication network by which other electronic, computing, and communication devices communicate data with the computing system 1000.

The computing system 1000 may include one or more processors 808 (e.g., any of microprocessors, controllers, and the like), which process various computer-executable instructions to control the operation of the computing system 1000 and to enable techniques for, or in which can be embodied, exchanging status messages during a call. Alternatively, or in addition, the computing system 1000 may be implemented with any one or combination of hardware, firmware, or fixed logic circuitry that is implemented in connection with processing and control circuits, which are generally identified at 1010. Although not shown, the computing system 1000 may include a system bus or data transfer system that couples the various components within the device. A system bus may include any one or combination of different bus structures, including a memory bus or memory controller, a peripheral bus, a universal serial bus, and/or a processor or local bus that utilizes any of a variety of bus architectures.

The computing system 1000 may additionally include computer-readable media 212, including one or more memory devices that enable persistent and/or non-transitory data storage (e.g., in contrast to mere signal transmission), examples of which include random access memory (RAM), non-volatile memory (e.g., any one or more of a read-only memory (ROM), flash memory, EPROM, EEPROM, and so forth), and a disk storage device. The disk storage device may be implemented as any type of magnetic or optical storage device, including a hard disk drive, a recordable and/or re-writeable compact disc (CD), any type of a digital versatile disc (DVD), and the like. The computing system 1000 may also include a mass storage media device (storage media) 1012. The computer-readable media 212 provides data storage mechanisms to store the device data 1002, as well as various device applications 1014 and any other types of information and/or data related to operational aspects of the computing system 1000. For example, an operating system 1016 is maintained as a computer application with the computer-readable media 212 and executed on the processors 808. The device applications 1014 may include a device manager, including any form of a control application, software application, signal-processing and control module, code that is native to a particular device, a hardware abstraction layer for a particular device, and so on. Using the message module 214 of the computer-readable media 212, the computing system 1000 may exchange status messages during a call with another computing system.

CONCLUSION

Although techniques and devices for exchanging status messages during a call have been described in language specific to features and/or methods, it is to be understood that the subject of the appended claims is not necessarily limited to the specific features or methods described. Rather, the specific features and methods are disclosed as example implementations of exchanging status messages during a call.

Some Examples are described below:

Example 1: A method performed by a first computing device, the method comprising: receiving registration in a wireless communication network: establishing a real-time person-to-person media session over the wireless communication network with a second computing device: performing a handshake procedure with the second computing device, the handshake procedure performed to determine whether the second computing device supports an exchange of status messages between the second computing device and the first computing device; generating a status message, the status message comprising status information of the first computing device; and responsive to determining that the second computing device supports the exchange of status messages between the second computing device and the first computing device, sending a status message to the second computing device through the wireless communication network.

Example 2: The method as recited by example 1, wherein: receiving registration in a wireless communication network includes receiving registration in an Internet Protocol Multimedia Core Network Subsystem, IMS, network: establishing the real-time person-to-person media session includes establishing an audio call over the IMS network with the second computing device; and sending the status message to the second computing device includes sending the status message to the second computing device through the IMS network, the status message further comprising information regarding a condition of the audio call in real time and enabling the second computing device to mitigate call-quality issues of the audio call.

Example 3: The method as recited by any preceding example, wherein the status message is sent to the second computing device to enable the second computing device to identify a call-quality issue of the real-time person-to-person media session using the status information of the first computing device.

Example 4: The method as recited by any preceding example, wherein the handshake procedure comprises: sending a request message to the second computing device through the wireless communication network, the sent request message requesting an exchange of status messages between the second computing device and the first computing device: or receiving a request message from the second computing device through the wireless communication network, the received request message requesting the exchange of status messages between the second computing device and the first computing device.

Example 5: The method as recited by example 4, wherein the handshake procedure further comprises: responsive to sending a request message to the second computing device, receiving a response message from the second computing device through the wireless communication network, the received response message indicating that the second computing device supports the exchange of status messages between the second computing device and the first computing device: or responsive to receiving a request message from the second computing device, sending a response message to the second computing device through the wireless communication network, the sent response message indicating that the first computing device supports the exchange of status messages between the second computing device and the first computing device.

Example 6: The method as recited by any preceding example, the method further comprising receiving a second status message from the second computing device, the received second status message comprising status information of the second computing device.

Example 7: The method as recited by any preceding example, wherein: performing the handshake procedure includes using one or more dual-tone multi-frequency, DTMF, digits of A, B, C, or D; and sending the status message includes: generating a DTMF status message that includes one or more DTMF digits of A, B, C, or D; and sending the DTMF status message to the second computing device through the wireless communication network.

Example 8: The method as recited by any of examples 1 to 5, wherein: performing the handshake procedure includes using Real-Time Transport Protocol, RTP, header extensions; and sending the status message includes: generating an RTP status message that includes an RTP header extension; inserting the status information of the first computing device into the RTP header extension; and sending the RTP status message to the second computing device through the wireless communication network using RTP header extensions.

Example 9: The method as recited by example 8, the method further comprising: responsive to determining that the second computing device does not support an exchange of status messages between the second computing device and the first computing device using RTP header extensions, performing a second handshake procedure to determine whether the second computing device supports the exchange of status messages between the second computing device and the first computing device using one or more DTMF digits of A, B, C, or D.

Example 10: The method as recited by any preceding example, the method further comprising determining the status information of the first computing device by performing at least one of: determining a condition of the wireless communication network: determining a quality of the real-time person-to-person media session: determining a health status of the first computing device, the health status indicating a capability of the first computing device to perform the real-time person-to-person media session: determining at least one input to the first computing device from a user: or determining a custom message.

Example 11: The method as recited by example 9, wherein the status information of the first computing device is determined using at least one sensor of the first computing device.

Example 12: The method as recited by examples 10 or 11, the method further comprising: determining a change in the status information of the first computing device at a current time when compared to the status information of the first computing device at an earlier time: generating another status message to send to the second computing device that includes the determined change in the status information of the first computing device; and responsive to determining that the second computing device supports the exchange of status messages between the second computing device and the first computing device, sending the other status message to the second computing device, the determined change in the status information of the first computing device enabling the second computing device to mitigate call-quality issues of the real-time person-to-person media session.

Example 13: The method as recited by any preceding example, the method further comprising encoding the status message to prevent a third party from accessing the status information of the first computing device, the third party distinct from the first computing device and distinct from the second computing device.

Example 14: The method as recited by any one of examples 5 to 13, wherein the handshake procedure further comprises: triggering an active state of a timer upon sending the request message to the second computing device through the wireless communication network, the timer configured to remain in the active state for a duration of time and change to an inactive state upon expiration of the duration of time: resending the request message to the second computing device over the duration of time, responsive to determining the timer is in the active state; and responsive to receiving the response message from the second computing device through the wireless communication network, triggering the inactive state of the timer.

Example 15: The method as recited by any preceding claim, further comprising, prior to sending the status message, generating the status message using the status information of the first computing device.

Example 16: The method as recited by any previous example, wherein the real-time person-to-person media session comprises at least one of: an audio call; a video call; a connection on a shared server: VOLTE call: VOIP call: VoNR call; or VoWiFi call.

Example 17: A computing device comprising: at least one processor; and computer-readable storage media comprising instructions, responsive to execution by the processor, for directing the computing device to perform any one of the methods recited in examples 1 to 16.

What is claimed is:
1. A method performed by a first computing device, the method comprising:
receiving registration in a wireless communication network;
establishing a real-time person-to-person media session over the wireless communication network with a second computing device;
performing a handshake procedure with the second computing device using at least one Real-Time Transport Protocol (RTP) header extension, the handshake procedure performed to determine whether the second computing device supports exchange of status messages between the second computing device and the first computing device;
generating a status message, the status message comprising status information of the first computing device; and
responsive to determining that the second computing device supports exchange of status messages between the second computing device and the first computing device, sending the status message to the second computing device through the wireless communication network.

2. The method as recited by claim 1, wherein:
receiving registration in the wireless communication network includes receiving registration in an Internet Protocol Multimedia Core Network Subsystem, IMS, network;
establishing the real-time person-to-person media session includes establishing an audio call over the IMS network with the second computing device; and
sending the status message to the second computing device includes sending the status message to the second computing device through the IMS network, the status message further comprising information regarding a condition of the audio call in real time and enabling the second computing device to mitigate call-quality issues of the audio call.

3. The method as recited by claim 1, wherein the status message is sent to the second computing device to enable the second computing device to identify a call-quality issue of the real-time person-to-person media session using the status information of the first computing device.

4. The method as recited by claim 1, wherein the handshake procedure comprises:
sending a request message to the second computing device through the wireless communication network, the sent request message requesting an exchange of status messages between the second computing device and the first computing device; or
receiving a request message from the second computing device through the wireless communication network, the received request message requesting the exchange of status messages between the second computing device and the first computing device.

5. The method as recited by claim 4, wherein the handshake procedure further comprises:
responsive to sending the request message to the second computing device, receiving a response message from the second computing device through the wireless communication network, the received response message indicating that the second computing device supports exchange of status messages between the second computing device and the first computing device; or
responsive to receiving the request message from the second computing device, sending a response message to the second computing device through the wireless communication network, the sent response message indicating that the first computing device supports exchange of status messages between the second computing device and the first computing device.

6. The method as recited by claim 5, wherein the handshake procedure further comprises:
triggering an active state of a timer upon sending the request message to the second computing device through the wireless communication network, the timer configured to remain in the active state for a duration of time and change to an inactive state upon expiration of the duration of time;
resending the request message to the second computing device over the duration of time, responsive to determining the timer is in the active state; and
responsive to receiving the response message from the second computing device through the wireless communication network, triggering the inactive state of the timer.

7. The method as recited by claim 1, the method further comprising receiving a second status message from the second computing device, the received second status message comprising status information of the second computing device.

8. The method as recited by claim 1, wherein:
performing the handshake procedure includes using one or more dual-tone multi-frequency, DTMF, digits of A, B, C, or D; and
sending the status message includes:
generating a DTMF status message that includes one or more DTMF digits of A, B, C, or D; and
sending the DTMF status message to the second computing device through the wireless communication network.

9. The method as recited by claim 1, wherein sending the status message includes:
generating an RTP status message that includes an RTP header extension;
inserting the status information of the first computing device into the RTP header extension; and
sending the RTP status message to the second computing device through the wireless communication network.

10. The method as recited by claim 9, the method further comprising:
responsive to determining that the second computing device does not support exchange of status messages between the second computing device and the first computing device using RTP header extensions, performing a second handshake procedure to determine whether the second computing device supports exchange of status messages between the second computing device and the first computing device using one or more DTMF digits of A, B, C, or D.

11. The method as recited by claim 1, the method further comprising determining the status information of the first computing device by performing at least one of:
determining a condition of the wireless communication network;
determining a quality of the real-time person-to-person media session;
determining a health status of the first computing device, the health status indicating a capability of the first computing device to perform the real-time person-to-person media session;
determining at least one input to the first computing device from a user; or
determining a custom message.

12. The method as recited by claim 11, the method further comprising:
determining a change in the status information of the first computing device at a current time when compared to the status information of the first computing device at an earlier time;
generating another status message to send to the second computing device that includes the determined change in the status information of the first computing device; and
responsive to determining that the second computing device supports exchange of status messages between the second computing device and the first computing device, sending the other status message to the second computing device, the determined change in the status information of the first computing device enabling the second computing device to mitigate call-quality issues of the real-time person-to-person media session.

13. The method as recited by claim 1, the method further comprising encoding the status message to prevent a third party from accessing the status information of the first computing device, the third party distinct from the first computing device and distinct from the second computing device.

14. The method as recited by claim 1, further comprising, prior to sending the status message, generating the status message using the status information of the first computing device.

15. A first computing device comprising:
at least one processor; and
computer-readable storage media comprising instructions, responsive to execution by the at least one processor, for directing the computing device to:
receive registration in a wireless communication network;
establish a real-time person-to-person media session over the wireless communication network with a second computing device;
perform (906) a handshake procedure with the second computing device using at least one Real-Time Transport Protocol (RTP) header extension, the handshake procedure performed to determine whether the second computing device supports exchange of status messages between the second computing device and the first computing device;
generate a status message, the status message comprising status information of the first computing device; and
responsive to determining that the second computing device supports exchange of status messages between the second computing device and the first computing device, send the status message to the second computing device through the wireless communication network.

16. The computing device of claim 15, wherein sending the status message includes:
generating an RTP status message that includes an RTP header extension;
inserting the status information of the first computing device into the RTP header extension; and
sending the RTP status message to the second computing device through the wireless communication network using RTP header extensions.

* * * * *